United States Patent
Zhou

(10) Patent No.: US 10,108,564 B2
(45) Date of Patent: Oct. 23, 2018

(54) ACTIVE AND STALL CYCLE BASED DYNAMIC SCALING OF PROCESSOR FREQUENCY AND BUS BANDWIDTH

(71) Applicant: QUALCOMM Incorporated, San Diego, CA (US)

(72) Inventor: Yizheng Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 15/082,863

(22) Filed: Mar. 28, 2016

(65) Prior Publication Data
US 2017/0277643 A1   Sep. 28, 2017

(51) Int. Cl.
| G06F 1/00 | (2006.01) |
| G06F 13/24 | (2006.01) |
| G06F 13/42 | (2006.01) |
| G06F 1/32 | (2006.01) |

(52) U.S. Cl.
CPC .............. *G06F 13/24* (2013.01); *G06F 1/324* (2013.01); *G06F 1/3206* (2013.01); *G06F 1/3234* (2013.01); *G06F 1/3243* (2013.01); *G06F 13/4282* (2013.01)

(58) Field of Classification Search
CPC ....... G06F 1/3206; G06F 1/3243; G06F 13/24
See application file for complete search history.

(56) References Cited

U.S. PATENT DOCUMENTS

| 6,076,171 | A | 6/2000 | Kawata |
| 2012/0102345 | A1 | 4/2012 | Park et al. |
| 2014/0325247 | A1 | 10/2014 | Sodhi et al. |
| 2014/0337849 | A1* | 11/2014 | Seo .......................... G06F 9/46 718/102 |
| 2015/0095009 | A1* | 4/2015 | Brock ................. G06F 17/5009 703/21 |
| 2015/0095620 | A1* | 4/2015 | Ananthakrishnan ........................ G06F 9/30083 712/220 |
| 2015/0106649 | A1 | 4/2015 | Kannan |
| 2015/0317762 | A1 | 11/2015 | Park et al. |

OTHER PUBLICATIONS

International Search Report and Written Opinion—PCT/US2017/014714—ISA/EPO—dated Mar. 29, 2017 (15 pages).
Liang, et al., "An Energy Conservation DVFS Algorithm for the Android Operating System," Journal of Convergence, Dec. 2010, vol. 1 (1), pp. 93-100.
Hicks et al., "CSE 430 Project Wiki Spring 2011", CSE 430 Course Website, May 11, 2011, retrieved from http://cse-wiki.unl.edu/wiki/index.php/CSE_430_Project_Wiki_Spring_2011, 14 pp.

(Continued)

*Primary Examiner* — Austin Hicks
(74) *Attorney, Agent, or Firm* — Shumaker & Sieffert, P.A.

(57) ABSTRACT

Techniques are described in which to determine as separate values the active time and the stall time of a processing unit at different operating frequencies of the processing unit and bus bandwidths of a bus that interconnects the processing unit to system memory. The techniques may adjust the operating frequency of the processing unit and/or bus bandwidth based on the determined active times and stall times.

27 Claims, 8 Drawing Sheets

(56) References Cited

OTHER PUBLICATIONS

Response to Written Opinion dated Mar. 29, 2017, from International Application No. PCT/US2017/014714, filed on Jul. 27, 2017, 21 pp.
International Preliminary Report on Patentability from corresponding PCT Application Serial No. PCT/US2017/014714 dated Feb. 14, 2018 (21 pages).

* cited by examiner

ACTIVE AND STALL CYCLE BASED DYNAMIC SCALING OF PROCESSOR FREQUENCY AND BUS BANDWIDTH

TECHNICAL FIELD

This disclosure relates to dynamic adjustment of frequency and bandwidth, and more particularly, to dynamic scaling of processor frequency and bus bandwidth.

BACKGROUND

Mobile devices are powered by batteries of limited size and/or capacity. Typically, mobile devices are used for making phone calls, checking email, recording/playback of a picture/video, listening to radio, navigation, web browsing, playing games, managing devices, and performing calculations, among other things. Many of these actions utilize different processing units to perform some tasks. Examples of the processing unit include a central processing unit (CPU), a digital signal processor (DSP), a graphics processing unit (GPU), and the like. These processing units can typically consume a large amount of power in mobile devices. As such, it is beneficial to manage the power consumption of such processing units in order to prolong battery life.

SUMMARY

In general, the disclosure describes techniques for adjusting an operating frequency of a processing unit and/or the bus bandwidth. As described in more detail, Dynamic Power Manager (DPM) may separately consider an active time of a processing unit and a stall time of the processing unit to determine the combination of the frequency of the processing unit and bus bandwidth. The DPM may be a software module executing on the circuitry, hardware circuitry, or a combination thereof. The circuitry that includes the DPM (e.g., that executes the DPM or includes the hardwired circuitry of the DPM) may be on the processing unit or on a different processing unit.

The stall time is indicative of delay in processing by the processing unit operating in a first clock domain due to delay in processing in second, different clock domain. Active time is indicative of how long components of the processing unit are active.

The circuitry of the DPM may be configured to determine what the active time of the processing unit would be if the frequency and/or bus bandwidth were adjusted to another frequency and/or bus bandwidth, and determine, as a separate value, what the stall time of the processing unit would be if the frequency and/or bus bandwidth were adjusted to another frequency and/or bus bandwidth. The circuitry of the DPM unit may then determine whether to adjust the frequency and/or bus bandwidth. By decoupling the active time and the stall time for determining whether to adjust the frequency and bus bandwidth, the circuitry of the DPM may more accurately determine frequency and bus bandwidth that provides the maximum possible power saving with no performance degradation as compared to examples where active time and stall time are grouped together into a single value for determining frequency and bus bandwidth.

In one example, the disclosure describes a method of operating point determination, the method comprising determining a first active time of a processing unit at a first operating point, determining a first stall time of the processing unit at the first operating point, determining a second active time of the processing unit based on the first active time at a second operating point, determining a second stall time of the processing unit based on the first stall time at the second operating point, determining whether to adjust an operating point of the processing unit from the first operating point to the second operating point based on the second active time and the second stall time, and adjusting the operating point of the processing unit from the first operating point to the second operating point based on the determination to adjust the operating point of the processing unit.

In one example, the disclosure describes a device for operating point determination, the device comprising a processing unit, and circuitry. The circuitry is configured to determine a first active time of the processing unit at a first operating point, determine a first stall time of the processing unit at the first operating point, determine a second active time of the processing unit based on the first active time at a second operating point, determine a second stall time of the processing unit based on the first stall time at the second operating point, determine whether to adjust an operating point of the processing unit from the first operating point to the second operating point based on the second active time and the second stall time, and adjust the operating point of the processing unit from the first operating point to the second operating point based on the determination to adjust the operating point of the processing unit.

In one example, the disclosure describes a device for operating point determination, the device comprising means for determining a first active time of a processing unit at a first operating point, means for determining a first stall time of the processing unit at the first operating point, means for determining a second active time of the processing unit based on the first active time at a second operating point, means for determining a second stall time of the processing unit based on the first stall time at the second operating point, means for determining whether to adjust an operating point of the processing unit from the first operating point to the second operating point based on the second active time and the second stall time, and means for adjusting the operating point of the processing unit from the first operating point to the second operating point based on the determination to adjust the operating point of the processing unit.

In one example, the disclosure describes a computer-readable storage medium having instructions stored thereon that when executed cause one or more processors to determine a first active time of a processing unit at a first operating point, determine a first stall time of the processing unit at the first operating point, determine a second active time of the processing unit based on the first active time at a second operating point, determine a second stall time of the processing unit based on the first stall time at the second operating point, determine whether to adjust an operating point of the processing unit from the first operating point to the second operating point based on the second active time and the second stall time, and adjust the operating point of the processing unit from the first operating point to the second operating point based on the determination to adjust the operating point of the processing unit.

The details of one or more examples are set forth in the accompanying drawings and the description below. Other features, objects, and advantages will be apparent from the description, drawings, and claims.

DETAILED DESCRIPTION

Figure 1:
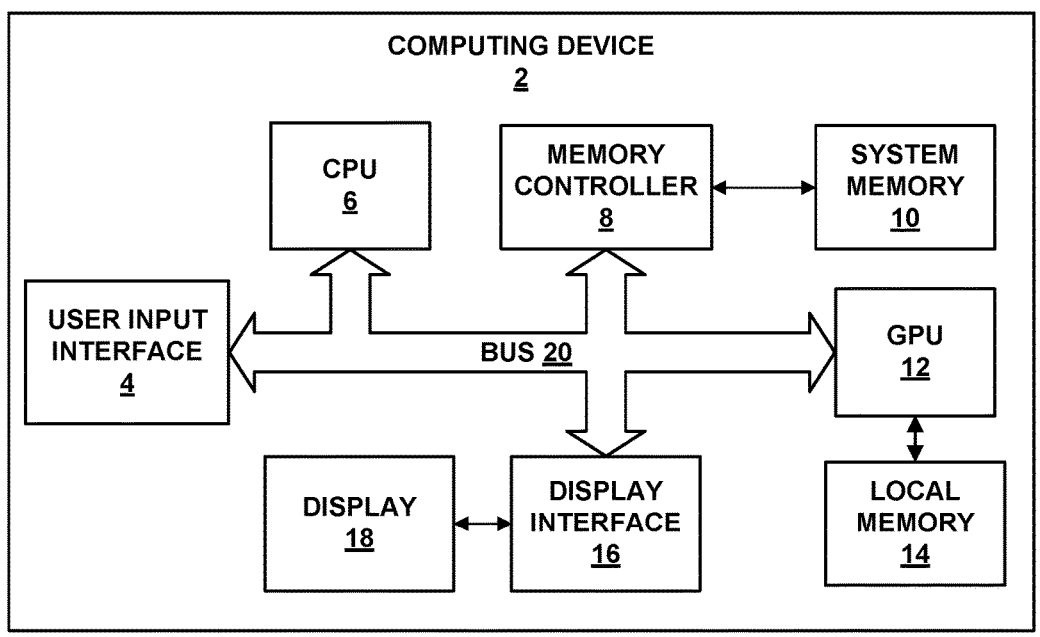
FIG. 1 is a block diagram illustrating an example device for processing data in accordance with one or more example techniques described in this disclosure.

Two factors that can affect how fast a processor can process data, and how much power the processor consumes, include the operating frequency of the processor and the bus bandwidth. The bus bandwidth indicates how much data can travel via the bus per unit of time. The bus interconnects various units together (e.g., processor(s), system memory, display, etc.). Another term for the bus is fabric, and another term for the bus bandwidth is fabric bandwidth.

The operating frequency defines the amount of data the processor can process per unit of time. As described in more detail, a dynamic power manager (DPM) may be configured to perform the example techniques described in this disclosure to determine the frequency of the processor and the bus bandwidth. The DPM may be hardware or software, and may be part of the device whose operating frequency is being controlled but may be external to the device whose operating frequency is being controlled.

The techniques described in this disclosure are generally applicable to a wide variety of processors such as central processing units (CPUs), graphics processing units (GPUs), digital signal processors (DSPs) used in modems, audio, or sensor subsystems. Simply for ease of description, the examples are described with respect to a GPU.

Where the operating frequency of the CPU is being controlled, the DPM may be part of the CPU (e.g., dynamic clock and voltage scaling (DCVS) module). The DCVS module controls voltage levels of various components (e.g., circuitry that includes the clock generator), which in turn controls the operating frequency of the CPU (e.g., controls the frequency of the clock signal generated by the clock generator). Where the operating frequency of the GPU is being controlled, the DPM may be a part of the GPU (e.g., GPU DCVS executing as a control program on a command processing unit in the GPU). In some examples, the operating frequency of the GPU may be controlled, but the DPM may be part of the CPU (e.g., GPU DCVS driver running on the CPU). In some examples, the DPM may be part of an external device (e.g., hardware or software on a relatively independent small processor). In such examples, the DPM may periodically wakeup to determine whether to control the operating frequency of the device whose operating frequency is being controlled. In any event, the DPM scales the operating frequency of the device and votes for bus bandwidth.

As described in more detail, this disclosure describes example techniques to save power. In general, the lower the operating frequency or bandwidth, the lower the power consumption is. So these two factors affect both performance and power. The example techniques set the system to the lowest necessary operating frequency and bandwidth; "lowest necessary" means it can approach the maximal possible power saving with no performance degradation.

For example, a host processor (e.g., CPU), via the DPM, may be configured to scale the bus bandwidth and the operating frequency of the GPU based on a "busy time" of the GPU, where the GPU busy time equals GPU active plus stall time. GPU active time equals the amount the GPU is performing some arithmetic, logic, control flow, or local cache/memory operations in its own clock domain, and not waiting for operations in a different clock domain, for example, system memory access operations. A clock domain is a block of circuitry that operates at a single clock frequency that may be different from the frequency of other blocks of circuitry (e.g., on the same chip or off-chip). For example, there may be multiple clock domains such that the CPU and its cache are in one clock domain, the GPU and its cache are in another clock domain, and the system memory is in yet another clock domain.

The GPU stall time is indicative of the amount of time the GPU is stalled while waiting on data from another clock domain (e.g., a hardware unit operating in a different clock domain). As an example, the local cache of the GPU may be in the same clock domain as the circuitry of the GPU. The GPU may attempt to retrieve data from the local cache first, and if unavailable (e.g., a cache miss), read the data from the system memory. However, the GPU may be stalled waiting on data from the system memory, and this delay is part of the GPU stall time.

Again, the example is described with respect to the CPU determining the operating frequency of the GPU (e.g., the DPM is a GPU DCVS driver executing on the CPU). However, the example techniques are applicable to other cases, as described above. Also, the example is described with respect to time (e.g., active time and stall time), but the analysis of percentages (e.g., active time percentage and stall time percentage) may be another way to implement the techniques. In this disclosure, the term "active time" is used generically to refer to the case where the active time is a measure of time (e.g., amount of time) and where active time is a ratio of time (e.g., percentage). Similarly, the term "stall time" is used generically to refer to the case where the stall time is a measure of time (e.g., amount of time) and where stall time is a ratio of time (e.g., percentage).

From the GPU busy time, the host processor may determine a GPU busy percentage (e.g., ratio of GPU busy time to a period of time). If the GPU busy percentage becomes greater than a threshold, the host processor may increase the bus bandwidth, GPU operating frequency, or both so that the GPU busy percentage becomes lower than the threshold. Conversely, if the GPU busy percentage is below the threshold (same threshold or different threshold), the host processor may determine whether the bus bandwidth, GPU operation frequency or both can be reduced. In this way, the host processor, via the DPM, can adjust the bus bandwidth, GPU operation frequency, or both to keep the system (e.g., host processor, GPU, and interconnect bus) running at the lowest necessary power level.

However, relying solely on the GPU busy time to determine whether to adjust the bus bandwidth, GPU operating frequency, or both may result in not making an adjustment to the bus bandwidth, GPU operating frequency, or both when adjustment is possible. For example, some techniques assume that the GPU busy time is inversely proportional to the GPU operating frequency. For such cases, the host processor may overestimate what the GPU operating frequency should be because the host processor failed to separately account for the GPU stall time and/or the GPU active time.

As an illustrative example, assume that if the host processor determines that the GPU busy percentage will be more than 90% after reduction in the GPU operating frequency, then the host processor is not to reduce the operating frequency. In this example, assume the GPU is operating at 200 MHz and is 50% busy. Because of the assumption that the GPU busy time is inversely proportional to the GPU operating frequency, the host processor may determine that if the operating frequency is reduced to 100 MHz, the GPU will be 100% busy. Because 100% busy is greater than 90% busy, the host processor would not downscale the operating frequency of the GPU.

However, in reality, the 50% busy time may actually be 30% for GPU active time and 20% for GPU stall time. As a first order approximation, if the operating frequency of the GPU were reduced to 100 MHz, then the GPU active time would double to 60%, and the GPU stall time would remain at 20% (in this example, the GPU stall time is due to cache misses and so the GPU operating frequency would not have any direct effect on how fast data is transferred to or from the system memory). In this example, the total busy percentage is 80% (e.g., 60%+20%). Since 80% is less than 90%, the host processor would downscale the operating frequency of the GPU to 100 MHz, and there would be no performance penalty. The same analysis can apply with the bus bandwidth.

The techniques described in this disclosure are based on determining what the GPU busy percentage will be for a given bus bandwidth and GPU operation frequency. In this disclosure, an "operating point" (OPP) refers to a specific combination of GPU operating frequency (GOF) and bus bandwidth (BB). For instance, OPP00=(GOF0, BB0), OPP01=(GOF0, BB1), OPP10=(GOF1, BB0), and so forth, where GOF0 and GOF1 are different GPU operation frequencies, and BB0 and BB1 are different bus bandwidths.

In some examples, the host processor, via the DPM, determines the GPU active time and stall time at a first OPP (e.g., with hardware performance counters built into the GPU, as described below) and uses this information to determine the GPU active time and stall time at a second OPP. In some examples, the hardware performance counters may count the amount of time the GPU is active and the amount of time the GPU is busy, and subtract the GPU active time from the GPU busy time to determine the GPU stall time. In some examples, it may be possible to use processor stall cycle counters, rather than determining the GPU busy time and subtracting the GPU active time to determine the GPU stall time. The host processor determines the GPU busy time at the second OPP from the determined GPU active time and stall time at the second OPP. The equations to determine the GPU busy time at the second OPP may be as follows:

OPP00=current operating point with GOF0 and FB0
TG1=processor active time at OPP00 (based on counters)
TM1=processor stall time at OPP00 (also measured from counters).
OPP11=operating point with GOF1 and FB1
TG2=processor active time at OPP11 and equals TG1*(GOF0/GOF2)
TM2=processor stall time at OPP11 and equals TM1*(FB0/FB1) processor busy time at OPP11=TG2+TM2.

In the above, FB0 corresponds to the bus bandwidth associated with operating point OPP00. However, in some examples, rather than using FB0, the host processor may use the effective bus bandwidth, which is defined as the total amount of data transferred through the GPU-bus interface divided by the period of time during which the interface is busy transferring data. Because the host processor votes on what the bus bandwidth should be, it is possible that the effective bus bandwidth is different than what the host processor determined.

The host processor may measure the effective bus bandwidth by determining the amount of data through the processor (e.g., CPU or GPU) bus interface over a period time. To set to the current operating point of OPP00, the host processor sets the frequency of the GPU to GOF0, and voted to set the bus bandwidth to FB0. It may be possible that the effective bus bandwidth ends up being something different than FB0, for example, if a decision is made to set the bus bandwidth to a different level. For such cases, the host processor may use the effective bus bandwidth in place of the FB0 value.

From the GPU busy time, the host processor may determine the GPU busy percentage and determine whether the GPU busy percentage is less than the threshold. If the GPU busy percentage is less than the threshold, the GPU may decrease the GPU operating frequency and/or bus bandwidth (e.g., move from OPP00 to OPP11).

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buss and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

Although the above example is described with respect to graphics processing, the techniques described in this disclosure are not so limited. The example described with respect to graphics processing are provided to assist with understanding. The techniques are applicable to other processing as well, such as processing performed by some other digital or analog signal processor.

In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 10 may include instructions that cause CPU 6 and/or GPU 12 to perform the functions ascribed in this disclosure to CPU 6 and GPU 12. Accordingly, system memory 10 may be a computer-readable storage medium having instructions stored thereon that, when executed, cause one or more processors (e.g., CPU 6 and GPU 12) to perform various functions.

In some examples, system memory 10 is a non-transitory storage medium. The term "non-transitory" indicates that the storage medium is not embodied in a carrier wave or a propagated signal. However, the term "non-transitory" should not be interpreted to mean that system memory 10 is non-movable or that its contents are static. As one example, system memory 10 may be removed from device 2, and moved to another device. As another example, memory, substantially similar to system memory 10, may be inserted into device 2. In certain examples, a non-transitory storage medium may store data that can, over time, change (e.g., in RAM).

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, for example, drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements including hardware circuitry such as arithmetic logic units (ALUs), elementary function units (EFUs), and other such circuitry that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 and CPU 6 may include one or more processors, such as one or more microprocessors, application specific integrated circuits (ASICs), field programmable gate arrays (FPGAs), digital signal processors (DSPs), or other equivalent integrated or discrete logic circuitry, including programmable circuitry.

GPU 12 may be directly coupled to local memory 14. Thus, GPU 12 may read data from and write data to local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. Local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

As described, CPU 6 may offload graphics processing to GPU 12, such as tasks that require massive parallel operations. As one example, graphics processing requires massive parallel operations, and CPU 6 may offload such graphics processing tasks to GPU 12. However, other operations such as matrix operations may also benefit from the parallel processing capabilities of GPU 12. In these examples, CPU 6 may leverage the parallel processing capabilities of GPU 12 to cause GPU 12 to perform non-graphics related operations.

In some example techniques described in this disclosure, a first processing unit (e.g., CPU 6) offloads certain tasks to a second processing unit (e.g., GPU 12). To offload tasks, CPU 6 outputs commands to be executed by GPU 12 and data that are operands of the commands (e.g., data on which the commands operate) to system memory 10 and/or directly to GPU 12. GPU 12 receives the commands and data, directly from CPU 6 and/or from system memory 10, and executes the commands. In some examples, rather than storing commands to be executed by GPU 12, and the data operands for the commands, in system memory 10, CPU 6 may store the commands and data operands in a local memory that is local to the IC that includes GPU 12 and CPU 6 and shared by both CPU 6 and GPU 12 (e.g., data or instruction cache). In general, the techniques described in this disclosure are applicable to the various ways in which CPU 6 may make available the commands for execution on GPU 12, and the techniques are not limited to the above examples.

The rate at which GPU 12 executes the commands is set by the frequency of a clock signal (also referred to as a clock rate or operating frequency of GPU 12). For example, GPU 12 may execute a command every rising or falling edge of the clock signal, or execute one command every rising edge and another command every falling edge of the clock signal. Accordingly, how often a rising or falling edge of the clock signal occurs within a time period (e.g., frequency of the clock signal) sets how many commands GPU 12 executes within the time period.

In some cases, while GPU 12 is executing commands, GPU 12 may need to read data from or write data to system memory 10 via bus 20. For instance, if there is a cache miss (e.g., the data or instruction is not available in data cache or instruction cache of GPU 12), GPU 12 may read the data from system memory 10 via bus 20. The instruction cache and the data cache of GPU 12 may be different than local memory 14. For instance, GPU 12 may use local memory 14 to store intermediate data temporarily, and data cache and instruction cache may store the operands and instructions, respectively. In some cases, it may be possible for local memory 14 to include the instruction and data cache.

How long GPU 12 waits until the data is available from system memory 10 or the data is written to system memory 10 (also referred to as the GPU stall time) is a function of bus bandwidth of bus 20. The bus bandwidth may be a function of the operating frequency of system memory 10 (e.g., for a fast operating frequency of system memory 10, more data can be placed on bus 20 and for a slow operating frequency of system memory 10, less data can be placed on bus 20). Therefore, the amount of commands that GPU 12 can execute within the time period is also a function of the bus bandwidth.

In some examples, such as those where CPU 6 stores commands to be executed by GPU 12 in memory (e.g., system memory 10 or instruction cache), CPU 6 may output memory address information identifying a group of commands that GPU 12 is to execute. The group of commands that GPU 12 is to execute is referred to as submitted commands. In examples where CPU 6 directly outputs the commands to GPU 12, the submitted commands includes those commands that CPU 6 instructs GPU 12 to execute immediately.

There may be various ways in which CPU 6 may group commands. As one example, a group of commands includes all the commands needed by GPU 12 to render one frame. As another example, a group of commands may be so-called "atomic commands" that are to be executed together without GPU 12 switching to other commands. Other ways to group commands that are submitted to GPU 12 may be possible, and the disclosure is not limited to the above example techniques.

In some cases, GPU 12 may need to execute the submitted commands within a set time period. For instance, device 2 may be handheld device, where display 18 also functions as the user interface. As one example, to achieve a stutter free (also referred to as jank-free) user interface, GPU 12 may need to complete execution of the submitted commands within approximately 16 milliseconds (ms), assuming a frame rate of 60 frames per second (other time periods are possible). This 16 ms time period may be referred to as a "vsync" window, and if GPU 12 does not complete execution of the submitted commands within the vsync window, there may be "bubbles" in an execution pipeline of GPU 12 causing a jank filled user interface.

The "bubbles" in the execution pipeline of GPU 12 refers to conditions where units of GPU 12 that are executing the commands have partially completed the execution of the commands to produce some intermediate data, but units of GPU 12 that are to receive the intermediate data are still busy executing other commands causing the intermediate data to keep building. For instance, the execution pipeline of GPU 12 includes a series of interconnected circuitry that each produce intermediate data that is further processed by the next circuit in the series (i.e., in the pipeline). In some cases, upstream circuits of an execution pipeline of GPU 12 are producing intermediate data faster than downstream circuits of the execution pipeline of GPU 12 can consume, creating a so-called bubble.

The amount of commands that CPU 6 submits and the timing of when CPU 6 submits commands need not necessarily be constant. There may be an influx or reduction in the number of commands GPU 12 is to execute. For example, the application executing on CPU 6 (e.g., a third-party application) may increase or decrease the number of commands to be executed by GPU 12, or an operating system executing on CPU 6 (e.g., the framework itself) may increase or decrease the number of commands to be executed by GPU 12. As another example, CPU 6 may submit a first group of commands at time 0, a second group of commands at time 1, and a third group of commands at time 2. However, the time interval between the submission of the first group of commands and the second group of commands may be different than the time interval between the submission of the second group of commands and the third group of commands.

Because the amount of commands GPU 12 is to execute within a period (e.g., 16 ms) may change, the frequency of the clock signal of GPU 12 (i.e., operating frequency of GPU 12) may need to increase or decrease so that GPU 12 is able to execute the commands within the set time period, without unnecessarily increasing power consumption. The amount of commands GPU 12 needs to execute within the set time period may change because there are more or fewer commands in a group of commands that need to be executed within the time period, because there is an increase or decrease in the number of groups of commands that need to be executed within the set time period, or a combination of the two.

Also, to execute the commands, GPU 12 may need to retrieve data from or output data to system memory 10 via bus 20. For example, GPU pipelines of GPU 12 may attempt to retrieve data from GPU cache. In the event of a cache miss, GPU 12 retrieves the data from system memory 10. While GPU 12 waits for the data to arrive from system memory 10, GPU 12 may be stalled. The rate at which GPU 12 can retrieve data from or output data to system memory 10 is a function of the bus bandwidth of bus 20.

Accordingly, there are at least two factors that together control how quickly GPU 12 is to complete execution of commands. The first factor is the operating frequency of GPU 12 (e.g., how fast data can move through the circuitry of the graphics pipelines). The second factor is the bus bandwidth of bus 20. As described in more detail, CPU 6 may determine the operating frequency of GPU 12 and bus bandwidth of bus 20 that together provides for minimal power use without impact on the ability of GPU 12 to complete timely execution.

For instance, GPU 12 may be configured to operate at different operating frequencies (e.g., 200 MHz, 300 MHz, 420 MHz, and 600 MHz) and CPU 6 may be configured to set the bus bandwidth of bus 20 to different frequencies (e.g., 2.2 GB/s, 4.0 GB/s, 7.0 GB/s, and 12.7 GBs). Each pair of operating frequency and bus bandwidth forms an "operating point" (OPP). For example, OPP00 refers to the operating point where bus bandwidth is 12.7 GB/s and the operating frequency is 600 MHz. OPP10 refers to the operating point where bus bandwidth is 12.7 GB/s and the operating frequency is 420 MHz. OPP01 refers to the operating point where bus bandwidth is 7.0 GB/s and the operating frequency is 600 MHz. In this way, for each pair of bus bandwidth and operating frequency there is a corresponding operating point.

In the techniques described in this disclosure, GPU 12 may be operating at a first operating point, and CPU 6 (e.g., via a dynamic power manager (DPM)) may determine whether the operating point of GPU 12 can be adjusted from the first operating point to a second operating point without an impact on performance. In the case where CPU 6 is adjusting from the first operating point to the second operating point without impact on performance, CPU 6 may attempt to reduce at least one of or even both of the operating frequency of GPU 12 and the bus bandwidth of bus 20. In some cases, CPU 6 may be able to directly control the operating frequency of GPU 12, but may need to vote for controlling the bus bandwidth of bus 20.

The bandwidth vote may be different from the actual bus bandwidth, and the actual bus bandwidth may dynamically change at run time. This is because bus 20 is a shared resource, and many processing units may concurrently vote on the bus bandwidth. Voting on the bus bandwidth means that each of the processing units outputs information indicating what the bus bandwidth should be (as determined by the respective processing units). However, what the actual bus bandwidth ends up being may be different than the vote provided by each processing unit. A bus driver executing on CPU 6 or another processing unit may aggregate bandwidth votes or requests, and scales the clocks (e.g., sets the actual bus bandwidth) based on the aggregated result. As one example, the bus driver may select the max vote as the actual bus bandwidth, but other ways to determine the actual bus bandwidth are possible. In some, but not all cases, the aggregated bandwidth is generally equal or larger than any of the votes.

In the example techniques described in this disclosure, CPU 6 may utilize the effective bus bandwidth to determine to adjust from the first operating point to the second operating point. For instance, each operating point is associated with an operating frequency and a bus bandwidth. When CPU 6 sets GPU 12 to operate at a particular operating point, GPU 12 may operate at the set frequency, but the bus bandwidth may deviate from the bus bandwidth associated with the operating point (e.g., due to the voting). Accordingly, CPU 6 may use the effective bus bandwidth for calculating whether to adjust from one operating point to another, and not necessarily the bus bandwidth associated with the current operating point.

The effective bandwidth is the total amount of data transferred through the GPU-bus interface divided by the period of time during which the interface is busy transferring data. CPU 6, GPU 12, and the other processing units that vote on the bus bandwidth may include a bus interface component, which connects the processing units to bus 20. A hardware data counter in the respective bus interfaces count the transferred data and output information to CPU 6 indicating the amount of transferred data for CPU 6 to determine the effective bus bandwidth. There may be other ways to determine the effective bus bandwidth, and the example techniques are not limited to any particular way in which to determine the effective bus bandwidth.

Although CPU 6 may vote for the bus bandwidth, CPU 6 still contributes to the decision making process of what the bus bandwidth should be. CPU 6 uses the example techniques described in this disclosure for determining what the bus bandwidth should be. It is possible that the bus bandwidth determination made by CPU 6 is ultimately not the actual bus bandwidth but CPU 6 still contributes to the dynamic setting of the bus bandwidth.

Such dynamic control of the operating frequency and bus bandwidth, using the techniques of this disclosure, allows for effective control of the power consumption by device 2. For example, if the operating frequency and bus bandwidth were permanently kept at a relatively high frequency, then GPU 12 would be able to timely execute the submitted commands in most instances. However, executing commands at a relatively high frequency causes the power consumption of GPU 12 to increase and the power consumption of device 2 to also increase from supporting the high bandwidth of bus 20. If the operating frequency of GPU 12 and the bus bandwidth of bus 20 were permanently kept at a relatively low frequency, then the power consumption of GPU 12 and overall power of device 2 may be reduced, but GPU 12 may not be able to timely execute submitted commands in most instances, leading to janky behavior and possibly other unwanted effects.

The techniques described in this disclosure describe example ways in which to increase or decrease the operating frequency of GPU 12 and the bus bandwidth of bus 20 (e.g., vote to increase or decrease the bus bandwidth of bus 20) based on the active time and stall time of GPU 12 over a particular time period. Active time as used in this disclosure means the time during which GPU 12 is performing some arithmetic, logic, or control flow operations (e.g., executing an instruction) and not waiting for operations in a different clock domain to complete. As noted above, a clock domain is a block of circuitry that operates at the same frequency. There may be multiple different clock domains on the same chip (e.g., CPU 6 and GPU 12 may be on the same chip, but have different clock domains) and/or different clock domains in the same device (e.g., GPU 12 and system memory 10 may be in different clock domains).

In this disclosure, whenever processing circuitry (e.g., such as that of CPU 6 or GPU 12) performs an operation in response to a clock signal, the processing circuitry is considered to be active. Whenever processing circuitry is waiting for an operation to complete in another clock domain to proceed, the processing circuitry is considered to be stalled.

The GPU stall time is the time during which the graphics processing pipeline of GPU 12 is stalled while waiting for operations to complete in another clock domain. One example cause of stall time is a cache miss. GPU 12 may first attempt to retrieve data or instructions from respective caches, and if the data or instructions are not stored in the cache, while GPU 12 waits for the data or instructions from system memory 10, GPU 12 may be stalled. Another example of GPU stall time is from certain IO operations. For IO operations, some sub-operations are performed in the clock domain of GPU 12, which should be counted into the active time, and there would also be sub-operations in other clock domains for which the processors needs to be busy waiting, and should be counted into the processor stall time.

The stall time of GPU 12 and the idle time of GPU 12 should not be confused. For example, idle time of GPU 12 refers to after GPU 12 completed execution of a set of commands and is waiting for a new set of commands to execute. The stall time of GPU 12 refers to GPU 12 stalling in the middle of execution of a set of commands.

In the techniques described in this disclosure, CPU 6 may separately evaluate the active time of GPU 12 and the stall time of GPU 12 to determine the operating point at which GPU 12 should operate. For example, GPU 12 includes various circuitry blocks like arithmetic logic units (ALUs), elementary function units (EFUs), and others. Every time any of these units performs a function, GPU 12 is considered to be active. For instance, if on a rising or falling edge of the clock signal having the operating frequency, one of the circuitry blocks of GPU 12 performs an operation, GPU 12 is considered to be active. The operations performed by the circuitry block of GPU 12 may be due to execution of instructions, where the circuitry blocks are programmable blocks, or where the circuitry blocks are hardwired fixed-function circuitry blocks.

In this example, GPU 12 may increment an active cycle counter every time any one of these circuitry blocks performs a function. For example, GPU 12 may include a masked "OR" gate, where if a circuitry block performs a function, the input to the OR gate is a logic one. This way, if the output of the OR gate is a logic one, GPU 12 increments the active cycle counter, and if the output of the OR gate is a logic zero, GPU 12 does not increment the active cycle counter.

The active time of GPU 12 is the active cycle counter value divided by the operating frequency. For instance, the active cycle counter value indicates the number of clock cycles that passed during the execution of the commands and the operating frequency of GPU 12 indicates the rate at which the commands executed. The number of clock cycles divided by the clock rate (e.g., operating frequency) equals the amount of time GPU 12 is active. Accordingly, the active time of GPU 12 is inversely proportional to the operating frequency of GPU 12.

For the stall time, every clock cycle for which GPU 12 should have performed a function but was stalled due to a delay waiting on operations in another clock domain (e.g., in response to a cache miss), GPU 12 may be considered stall. In some cases, having a stall cycle counter may be complicated due to the parallel structure of GPU 12. However, since busy time equals active time plus stall time, GPU 12 may include a busy cycle counter. Every time GPU 12 performs an operation, GPU 12 may increment the busy cycle counter. There may be other ways to determine the busy time as well. The stall time is equal to the busy time minus the active time. In examples where a stall cycle counter is possible, GPU 12 may include such a counter and increment the stall cycle counter whenever there is a processor stall.

The processor stall time is based on the bus bandwidth of bus 20. For instance, if the bus bandwidth were relatively high, then the instructions or data would reach GPU 12 in less time than if the bus bandwidth were relatively low. Accordingly, the processor stall time is inversely proportional to the bus bandwidth of bus 20.

As noted above, the busy time of GPU 12 equals the active time plus the stall time. The busy time of GPU 12 divided by a period of time, which may be preset (e.g., 16 ms) or determined on the fly (e.g., based on when GPU 12 becomes idle), indicates a busy percentage of GPU 12. In the techniques described in this disclosure, CPU 6 may determine the busy percentage for different operating points, and based on the determined busy percentage, determine whether to adjust the operating point at which GPU 12 is operating to another operating point.

For instance, assume that CPU 6 determines the busy percentage of GPU 12 at a first operating point to be 50%, and determines that the busy percentage of GPU 12 at a second operating point having at least one of a lower operating frequency and/or lower bus bandwidth would be 80%, CPU 6 may adjust the operating point from the first operating point to the second operating point. If, however, CPU 6 determines that adjusting the operating point of GPU 12 to the second operating point results in a busy percentage of 95%, CPU 6 may not adjust the operating point of GPU 12 to the second operating point. In some examples, CPU 6 may test other operating points to identify whether CPU 6 should adjust the operating point to one of these other operating points. In this example, 90% may be the threshold, where if the busy percentage will be greater than 90%, CPU 6 does not adjust the operating point, and if the busy percentage will be less than 90%, CPU 6 does adjust the operating point.

In the techniques described in this disclosure, when GPU 12 is operating at a current operating point, CPU 6 may determine both the active time and stall time. CPU 6 may determine what the active time of GPU 12 would be at a different operating point and determine what the stall time would be at this different operating point. In particular, CPU 6 may separately determine what the active time and stall time of GPU 12 would be at this different operating point. For instance, rather than determining what the overall busy time of GPU 12 would be at this different operating point based on the overall busy time of GPU 12 at the current operating point, GPU 12 may determine each of the constituent values (e.g., active time and stall time) that together form the overall busy time of GPU 12.

It may be beneficial to separately determine each of the active time and stall time for operating point adjustment because operating frequency and bus bandwidth contribute to different portions of the busy time of GPU 12. For example, assume that the difference between a first operating point and a second operating point is only a change in the operating frequency and not in the bus bandwidth. In this case, the active time may be different between the first and second operating points, but the stall time may be the same because the stall time is a function of the bus bandwidth. CPU 6 may determine the busy time of GPU 12 at the second operating point to be the summation of the active time at the second operating point and the stall time at the second operating point (which may be the same as the stall time at the first operating point).

In the example, CPU 6 may determine a more accurate value of the busy time of GPU 12 at the second operating point as compared to determining the busy time of GPU 12 at the second operating point based on the busy time of GPU 12 at the first operating point. For instance, as another way to determine the busy time of GPU 12 at the second operating point, CPU 6 may assume that busy time of GPU 12 at the second operating point is inversely proportional to the operating frequency of the second operating point. As an example, CPU 6 may determine that the busy time at a first operating point is 50%, where the operating frequency is 200 MHz. In this example, CPU 6 may determine that the operating frequency at the second operating point is 100 MHz and the bus bandwidth is the same as for the first operating point. Because CPU 6 assumed that the busy time of GPU 12 is inversely proportional to the operating frequency, CPU 6 may determine that reducing the operating frequency by half (e.g., 100 MHz/200 MHz) results in doubling the busy percentage to 100% busy percentage (e.g., 50%*2).

However, determining that the busy percentage will be 100% at the second operating point may be an overestimation of the busy percentage. In the preceding example, only the active time is inversely proportional to the operating frequency, and the bus stall time is not inversely proportional to the operating frequency. Accordingly, CPU 6 may separately determine the active time and stall time at the second operating point, then determine the busy time at the second operating point, and then determine the busy percentage at the second operating point rather than directly determining the busy percentage (or busy time) at the second operating point based on the busy percentage (or busy time) at the first operating point.

As an illustration, refer back to the previous example where the busy time of GPU 12 equaled 50%. In this example, assume that the active time at the first operating point caused GPU 12 to be busy 30% and that the stall time at the first operating point cause GPU 12 to be busy for 20% (30%+20%=50%). In this case, because the operating frequency at the second operating point is 50% that of the operating frequency at the first operating point, the active time will contribute twice as much to the busy time (e.g., 60%, where 30%*2 equals 60%). The stall time may not change, and may therefore contribute the same to the busy time (e.g., 20%). For this example, GPU 12 may determine the busy time at the second operating point to be 80% (60%+20%=80%). A busy time of 80% may be a more accurate determination of the busy percentage of GPU 12 than the busy percentage determination of 100%, where the active time and stall time are not separately evaluated.

In these other examples that rely only on the total busy time instead of the constituent active and processor delay times to determine the operating point, to assist with scaling bus bandwidth to the lowest necessary level, it may be possible to profile different types of use cases to create a set of bus upscaling and downscaling thresholds based on the readings of bus counters/indicators for each operating frequency. For example, if the operating frequency is 300 MHz, CPU 6 may search a table for the available bus bandwidths of 300 MHz and the associated thresholds, if bus counters indicate the traffic is above the upscaling threshold, CPU 6 may vote for higher bandwidth, if it is below the downscaling threshold, it may vote for lower bandwidth, or otherwise, it makes no new bandwidth vote.

However, such profiling is extensive, and furthermore, may not even properly work for all use cases. For instance, an operating point with relatively higher bandwidth and lower operating frequency is more efficient for bus 20 or data intensive use cases. As a contrast, an operating point with relatively lower bandwidth and higher processor frequency is more efficient for processor or computation intensive use cases, and is very difficult to find a set of thresholds that work efficiently for both.

In this way, where each of the processor active time and stall time are used separately for determining the operating point, as compared to using only the busy time, the techniques of this disclosure provide for a more accurate way to determine the operating point at which to operate. Although the above example is described with respect to CPU 6 determining the operating point for GPU 12, the techniques described in this disclosure are not so limited. CPU 6 may determine the operating point for itself using the techniques described in this disclosure, or GPU 12 may determine the operating point for itself using the techniques described in this disclosure. As other examples, CPU 6 and/or GPU 12 may determine the operating point for some other DSP.

In general, circuitry on CPU 6, GPU 12, some other DSP, or some small circuitry block may be configured to determine the operating point determination. Circuitry (e.g., on CPU 6) may determine a first active time of a processing unit (e.g., GPU 12) at a first operating point and determine a first stall time of the processing unit at the first operating point.

The circuitry may determine a second active time of the processing unit based on the first active time at a second operating point and determine a second stall time of the processing unit based on the first stall time at the second operating point. The circuitry may then determine whether to adjust an operating point of the processing unit from the first operating point to the second operating point based on the second active time and the second stall time, and adjust the operating point of the processing unit from the first operating point to the second operating point based on the determination to adjust the operating point of the processing unit.

The circuitry that performs the operating point determination and the processing unit include transistors and passive components like capacitors, resistors, inductors and the like. These hardware components together form circuitry blocks including programmable blocks or fixed function blocks. The operating frequency controls the rate at which instructions/commands are processed through the circuitry blocks such as by controlling when transistors turn on and off of the processing unit.

Also, the circuitry that performs the operating point determination may be circuitry on a processing unit different than the processing unit whose operating point is being determined (e.g., the circuitry is on CPU 6, and the operating point determination is for GPU 12). In some examples, the circuitry that performs the operating point determination may be circuitry on the same processing unit whose operating point is being determined (e.g., the circuitry is on GPU 12, and the operating point determination is for GPU 12).

One example way in which the circuitry may perform the operating point determination is by executing instructions of a software/firmware module that causes the circuitry to perform the example techniques. In such example, the circuitry includes programmable blocks of the processing unit on which the software/firmware is executing (e.g., processing core of CPU 6 which includes programmable circuitry on which instructions execute). Another example way in which the circuitry may perform the operating point determination is by including hardwired circuitry (e.g., fixed-function circuitry). In some examples, the circuitry may include a combination of programmable blocks and fixed-function blocks.

Figure 2:
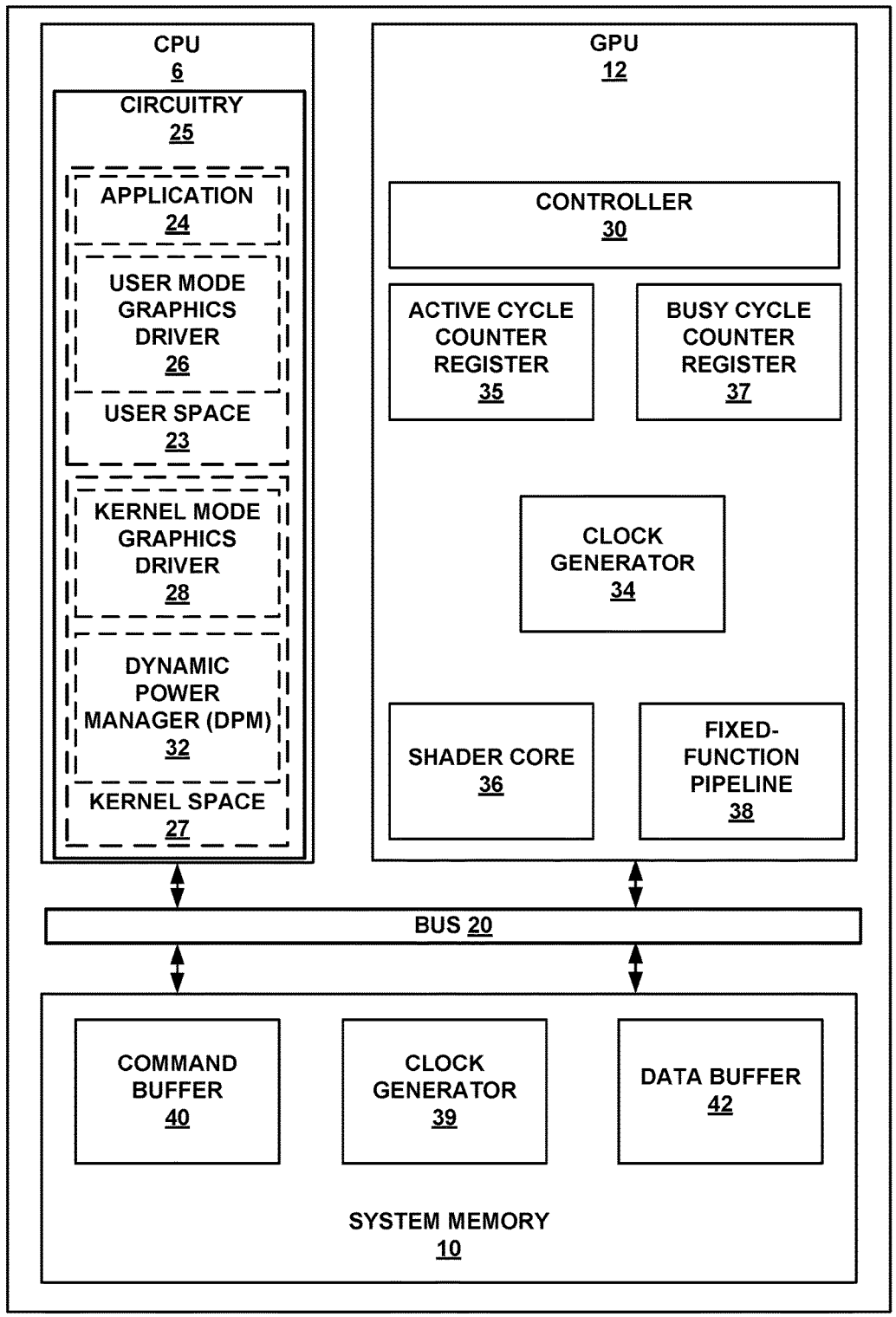
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 12 includes controller 30, clock generator 34, active cycle counter register 35, shader core 36, busy cycle counter register 37 and fixed-function pipeline 38. Shader core 36 and fixed-function pipeline 38 may together form circuitry of an execution pipeline used to perform graphics or non-graphics related functions. Although only one shader core 36 is illustrated, in some examples, GPU 12 may include one or more shader cores similar to shader core 36.

The commands that GPU 12 is to execute are executed by shader core 36 and fixed-function pipeline 38, as determined by controller 30 of GPU 12. Controller 30 may be implemented as hardware on GPU 12 or software or firmware executing on hardware of GPU 12. For example, controller 30 may execute on programmable circuitry of GPU 12 or may be a specialized circuit block within the larger GPU 12.

Controller 30 may receive commands that are to be executed for rendering a frame (e.g., one complete image ready for display) from command buffer 40 of system memory 10 via bus 20 or directly from CPU 6 via bus 20 (e.g., receive the submitted commands that CPU 6 determined should now be executed by GPU 12). Controller 30 may also retrieve the operand data for the commands from data buffer 42 of system memory 10 via bus 20 or directly from CPU 6 via bus 20. For example, command buffer 40 may store a command to add A and B. Controller 30 retrieves this command from command buffer 40 and retrieves the values of A and B from data buffer 42. Controller 30 may determine which commands are to be executed by shader core 36 (e.g., software instructions are executed on shader core 36) and which commands are to be executed by fixed-function pipeline 38 (e.g., commands for units of fixed-function pipeline 38).

In some examples, commands and/or data from one or both of command buffer 40 and data buffer 42 may be part of local memory 14 of GPU 12. For instance, GPU 12 may include an instruction cache and a data cache that stores commands from command buffer 40 and data from data buffer 42, respectively. In these examples, controller 30 may retrieve the commands and/or data from cache if available, and if there is a cache miss, retrieve commands and/or data from system memory 10.

Shader core 36 and fixed-function pipeline 38 may transmit and receive data from one another. For instance, some of the commands that shader core 36 executes may produce intermediate data that are operands for the commands that units of fixed-function pipeline 38 are to execute. Similarly, some of the commands that units of fixed-function pipeline 38 execute may produce intermediate data that are operands for the commands that shader core 36 is to execute. In this way, the received data is progressively processed through units of fixed-function pipeline 38 and shader core 36 in a pipelined fashion. Hence, shader core 36 and fixed-function pipeline 38 may be referred to as implementing an execution pipeline.

In general, shader core 36 allows for various types of commands to be executed, meaning that shader core 36 is programmable and provides users with functional flexibility because a user can program shader core 36 to perform desired tasks in most conceivable manners. The fixed-function units of fixed-function pipeline 38, however, are hardwired for the manner in which the fixed-function units perform tasks. Accordingly, the fixed-function units may not provide much functional flexibility.

Shader core 36 and fixed-function pipeline 38 may be formed with one or more circuit blocks. For example, shader core 36 and fixed-function pipeline 38 include one or more ALUs and EFUs, as well as other circuit blocks such as texture pipe L1 cache (TPL1) and GPU level 2 universal cache (UCHE). The ALUs may be digital electronic circuits that perform arithmetic and bitwise logical operations on integer binary numbers, and EFUs perform more complicated functions like sine, cosine, square root (sqrt), etc. If any of these circuit blocks (e.g., any of shader core 36 and/or fixed-function pipeline 38) perform a function during a clock cycle, GPU 12 is considered to be active for that clock cycle.

As also illustrated in FIG. 2, GPU 12 includes clock generator 34. Clock generator 34 outputs a clock signal that sets the time instances when shader core 36 and/or units of fixed-function pipeline 38 execute commands. Although clock generator 34 is illustrated as being internal to GPU 12, in some examples, clock generator 34 may be external to GPU 12. Also, clock generator 34 need not necessarily just provide the clock signal for GPU 12, and may provide the clock signal for other components as well.

Clock generator 34 may generate a square wave, a sine wave, a triangular wave, or other types of periodic waves. Clock generator 34 may include an amplifier to amplify the voltage of the generated wave, and output the resulting wave as the clock signal for GPU 12.

In some examples, on a rising edge or falling edge of the clock signal outputted by clock generator 34, shader core 36 and each unit of fixed-function pipeline 38 may execute one command. In some cases, a command may be divided into sub-commands, and shader core 36 and each unit of fixed-function pipeline 38 may execute a sub-command in response to a rising or falling edge of the clock signal. For instance, the command of A+B includes the sub-commands to retrieve the value of A and the value of B, and shader core 36 or fixed-function pipeline 38 may execute each of these sub-commands at a rising edge or falling edge of the clock signal.

The rate at which shader core 36 and units of fixed-function pipeline 38 execute commands may affect the power consumption of GPU 12. For example, if the frequency of the clock signal outputted by clock generator 34 is relatively high, shader core 36 and the units of fixed-function pipeline 38 may execute more commands within a time period as compared the number of commands shader core 36 and the units of fixed-function pipeline 38 would execute for a relatively low frequency of the clock signal. However, the power consumption of GPU 12 may be greater in instances where shader core 36 and the units of fixed-function pipeline 38 are executing more commands in the period of time (due to the higher frequency of the clock signal from clock generator 34) than compared to instances where shader core 36 and the units of fixed-function pipeline 38 are executing fewer commands in the period of time (due to the lower frequency of the clock signal from clock generator 34).

In some examples, the voltage applies to GPU 12 and clock generator 34 controls the maximum frequency of GPU 12. For a lower frequency, GPU 12 may work at a lower voltage as compared to the voltage when GPU 12 works at a higher frequency. Since power is proportional to frequency and voltage squared, by controlling the frequency and voltage applied to GPU 12, CPU 6 may control the amount of power consumed by GPU 12.

The frequency of the clock signal that clock generator 34 outputs sets the operating frequency of GPU 12, and may be one part of the operating point at which GPU 12 is operating. The other part of the operating point is the bus bandwidth of bus 20.

The bus bandwidth of bus 20 may be set by the frequency of the clock signal outputted by clock generator 39 of system memory 10. Clock generator 39 may be substantially similar to clock generator 34, but provides the clock signal for system memory 10. For instance, clock generator 39 controls the rate at which commands from command buffer 40 and/or data from data buffer 42 travels on bus 20. Because each of the components of device 2 may use system memory 10 to communicate with one another, clock generator 39 essentially sets the bus bandwidth of bus 20. The bus width (e.g., the amount of lines on which data can travel) affects how much data or commands can be sent on bus 20.

Similar to GPU 12 and clock generator 34, CPU 6 may control the voltages applied to memory controller 8, system memory 10, bus 20 and clock generator 39 to control the maximum frequencies of these components, which in turn is the same as controlling the bus bandwidth. Also similar to above, for a lower bus bandwidth of bus 20, these components may work at lower voltages as compared to the voltages when bus 20 works at a higher bandwidth. Since power is proportional to frequency and voltage squared, by controlling the bus bandwidth and voltages applied to memory controller 8, system memory 10, bus 20 and clock generator 39, CPU 6 may control the amount of power consumed by these components. By controlling the output of clock generator 34, which sets the operating frequency of GPU 12, and the output of clock generator 39, which sets the bus bandwidth of bus 20, CPU 6 may set the operating point at which GPU 12 operates.

In the illustrated example, GPU 12 and system memory 10 are in different clock domains because GPU 12 and system memory 10 operate using different clock signals (e.g., from clock generator 34 and 39, respectively). Accordingly, GPU 12 may be delayed in processing if waiting for data from system memory 10.

As described above, CPU 6 may offload tasks to GPU 12 due to the massive parallel processing capabilities of GPU 12. For instance, GPU 12 may be designed with a single instruction, multiple data (SIMD) structure. In the SIMD structure, shader core 36 includes a plurality of SIMD processing elements, where each SIMD processing element executes same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 12 to perform many tasks in parallel (e.g., at the same time). For such SIMD structured GPU 12, each SIMD processing element may execute one thread on a rising edge or falling edge of the clock signal.

To avoid confusion, this disclosure uses the term "command" to generically refer to a process that is executed by shader core 36 or units of fixed-function pipeline 38. For instance, a command includes an actual command, constituent sub-commands (e.g., memory call commands), a thread, or other ways in which GPU 12 performs a particular operation. Because GPU 12 includes shader core 36 and fixed-function pipeline 38, GPU 12 may be considered as executing the commands.

Also, in the above examples, shader core 36 or units of fixed-function pipeline 38 execute a command in response to a rising or falling edge of the clock signal outputted by clock generator 34. However, in some examples, shader core 36 or units of fixed-function pipeline 38 may execute one command on a rising edge and another, subsequent command on a falling edge of the clock signal. There may be other ways in which to "clock" the commands, and the techniques described in this disclosure are not limited to the above examples.

Because GPU 12 executes commands every rising edge, falling edge, or both, the frequency of clock signal (also referred to as clock rate) outputted by clock generator 34 sets the amount of commands GPU 12 can execute within a certain time. For instance, if GPU 12 executes one command per rising edge of the clock signal generated by clock generator 34, and the frequency of the clock signal is 1 MHz, then GPU 12 can execute one million commands in one second (as a theoretical upper limit). Also, if system memory 10 outputs one bit of data per rising edge of the clock signal generated by clock generator 39, and the frequency of this clock signal is 200 MHz and the bus width is 128 bits (16 bytes) (e.g., system memory 10 can transfer 16 bytes of data per rising edge of the clock signal), then the bus bandwidth of bus 20 may be 3.2 GB/s (200 MHz*16).

As illustrated in FIG. 2, the software stack running on CPU 6 includes user space 23 and kernel space 27 which are logical constructs to assist with understanding. Part of user space 23 is application 24 and user mode graphics driver 26. User mode graphics driver 26 prepares command buffers for GPU 12 and fills the buffers with instructions that are to be executed by GPU 12. Part of kernel space 27 is kernel mode graphics driver 28 and dynamic power manager (DPM) 32. Kernel mode graphics driver 28 schedules and submits command buffers to GPU 12. DPM 32 may be configured to perform the example operations to determine the operating frequency and bus bandwidth.

As illustrated, CPU 6 includes circuitry 25. Circuitry 25 includes programmable and fixed-function circuitry blocks. For example, circuitry 25 may include the programmable circuitry blocks formed with transistors, ALUs, EFUs, logic gates, and the like on which application 24, user mode graphics driver 26, kernel mode graphics driver 28, and DPM 32 execute. In some examples, circuitry 25 may be programmable circuitry used to execute only DPM 32. In some examples, such as examples where DPM 32 is a fixed-function circuit block, circuitry 25 includes such an example of DPM 32, and there may be separate programmable circuit blocks to execute application 24, user mode graphics driver 26, and kernel mode graphics driver 28.

CPU 6 executes application 24, as illustrated by the dashed boxes. During execution, application 24 and user mode graphics driver 26 generate commands that are to be executed GPU 12, including commands that instruct GPU 12 to retrieve and execute shader programs (e.g., vertex shaders, fragment shaders, compute shaders for non-graphics applications, and the like). In addition, application 24 and user mode graphics driver 26 generate the data on which the commands operate (i.e., the operands for the commands). CPU 6 stores the generated commands in command buffer 40, and stores the operand data in data buffer 42.

After CPU 6 stores the generated commands in command buffer 40, CPU 6 makes available the commands for execution by GPU 12. For instance, CPU 6 communicates to GPU 12 the memory addresses of a set of the stored commands and their operand data and information indicating when GPU 12 is to execute the set of commands. In this way, CPU 6 submits commands to GPU 12 for executing to render a frame.

As illustrated in FIG. 2, CPU 6 may also execute kernel mode graphics driver 28. In some examples, kernel mode graphics driver 28 may be software or firmware executing on hardware or hardware units of CPU 6. Kernel mode graphics driver 28 may be configured to allow CPU 6 and GPU 12 to communicate with one another. For instance, when CPU 6 offloads graphics or non-graphics processing tasks to GPU 12, CPU 6 offloads such processing tasks to GPU 12 via kernel mode graphics driver 28. For example, when CPU 6 outputs information indicating the amount of commands GPU 12 is to execute, kernel mode graphics driver 28 may be the unit of CPU 6 that outputs the information to GPU 12.

As additional examples, application 24 produces graphics data and graphics commands, and CPU 6 may offload the processing of this graphics data to GPU 12. In this example, CPU 6 may store the graphics data in data buffer 42 and the graphics commands in command buffer 40, and kernel mode graphics driver 28 may instruct GPU 12 when to retrieve the graphics data and graphics commands from data buffer 42 and command buffer 40, respectively, from where to retrieve the graphics data and graphics commands from data buffer 42 and command buffer 40, respectively, and when to process the graphics data by executing one or more commands of the set of commands.

Also, application 24 may require GPU 12 to execute one or more shader programs. For instance, application 24 may require shader core 36 to execute a vertex shader and a fragment shader to generate pixel values for the frames that are to be displayed (e.g., on display 18 of FIG. 1). Kernel mode graphics driver 28 may instruct GPU 12 when to execute the shader programs and instruct GPU 12 with where to retrieve the graphics data from data buffer 42 and where to retrieve the commands from command buffer 40 or from other locations in system memory 10. In this way, kernel mode graphics driver 28 may form a link between CPU 6 and GPU 12.

Kernel mode graphics driver 28 may be configured in accordance to an application processing interface (API); although kernel mode graphics driver 28 does not need to be limited to being configured in accordance with a particular API. In an example where device 2 is a mobile device, kernel mode graphics driver 28 may be configured in accordance with the OpenGL ES API. The OpenGL ES API is specifically designed for mobile devices. In an example where device 2 is a non-mobile device, kernel mode graphics driver 28 may be configured in accordance with the OpenGL API.

The number of commands that GPU 12 needs to execute within a period of time may be based on the commands needed to render one frame of the user-interface or gaming application. For the user-interface example, GPU 12 may need to execute the commands needed to render one frame of the user-interface within the vsync window (e.g., 16 ms assuming 60 frame-per-second) to provide a jank-free user experience. If there is a relatively large amount of content that needs to be displayed, then the amount of commands may be greater than if there is a relatively small amount of content that needs to be displayed.

To ensure that GPU 12 is able to execute the submitted commands within the set time period without device 2 consuming an unduly amount of power, DPM 32 of CPU 6 may control the operating frequency of GPU 12 (e.g., frequency of clock signal generated by clock generator 34) and the bus bandwidth of bus 20 (e.g., frequency of clock signal generated by clock generator 39). DPM 32, also referred to as dynamic clock and voltage scaling (DCVS) module, is illustrated as being software executing on CPU 6. However, DPM 32 may be hardware on CPU 6 or a combination of hardware and software or firmware.

DPM 32 may specialize a general purpose CPU 6 to perform the example operations described in this disclosure. In examples where DPM 32 is software, the operating system of CPU 6 may retrieve the instruction for DPM 32 from system memory 10 and a compiler executing on CPU 6 may compile the instructions into object code for execution or system memory 10 may store the object code of DPM 32. Circuitry 25 of CPU 6 may then execute DPM 32 to cause CPU 6 to perform the example techniques. In some other examples, DPM 32 may be circuit blocks within circuitry 25 on CPU 6 that are hardwired to cause CPU 6 to perform the example techniques described in this disclosure. In some examples, DPM 32 may be a combination of software and fixed hardware. In this disclosure, when CPU 6 is described as implementing example techniques, CPU 6 is implementing such techniques via circuitry 25 (e.g., via DPM 32 executing on circuitry 25 or circuitry 25 includes fixed-function circuit blocks of DPM 32).

GPU 12 may be operating at a current operating point which defines the operating frequency of GPU 12 (e.g., frequency of clock generator 34) and a bus bandwidth of bus 20 (e.g., frequency of clock generator 39). However, there may be a better operating point at which GPU 12 should operate. For instance, the operating frequency, the bus bandwidth, or both may be higher than necessary. As another example, the operating frequency, the bus bandwidth, or both may be too low, resulting in poor performance. DPM 32 may determine whether to adjust the operating point of GPU 12 from the current operating point to another operating point.

In one example, when this disclosure described CPU 6 as performing operations to determine processor active time, stall time, and the like, CPU 6 may perform such operations via DPM 32 of circuitry 25. DPM 32 determines the active time and the stall time of GPU 12 at the current operating point and determines the active time and stall time of GPU 12 at a different operation points (e.g., determines what the active time and stall time of GPU 12 would be if GPU 12 were to operate at this different operating point). In particular, DPM 32 separately determines what the active time would be at the different operating point and what the stall time would be at the different operating point rather than directly determining what the busy time would be at the different operating point.

Furthermore, although circuitry 25 is illustrated within CPU 6, the example techniques described in this disclosure are not so limited. In some examples, circuitry 25 may be part of GPU 12, and DPM 32 may execute on circuitry 25 within GPU 12 or by fixed-function circuit blocks within GPU 12. In such examples, the processing unit whose operating point is being determined (e.g., GPU 12) includes the circuitry for determining the operating point. In some examples, circuitry 25 may be its own standalone processing unit external to CPU 6 and GPU 12 whose purpose is to determine operating points of the various other processing units in device 2.

Simply for ease of description, the example techniques are described as circuitry 25 of CPU 6 determining the operating point of GPU 12 via DPM 32. However, these techniques are extendable to examples where circuitry 25 determines the operating point for a digital signal processor (DSP). Also, these techniques are extendable to examples where GPU 12 includes circuitry 25, as well as examples where circuitry 25 is its own standalone processing unit within the SoC that includes CPU 6 and GPU 12.

To determine the active time of GPU 12, DPM 32 may read the active cycle counter value from active cycle counter register 35. In some examples, any time at least one circuit block of GPU 12 performs a function on a rising or falling edge of the clock signal generated by clock generator 34, controller 30 increments the active cycle counter value in active cycle counter register 35. For instance, each of the circuit blocks may output an active signal to controller 30 indicating whether each of the circuit blocks performed an operation during a clock cycle. Controller 30 may apply the OR function to the received active signals, and if the output of the OR function is a logic one, controller 30 increments the active cycle counter value stored in active cycle counter register 35, and if the output of the OR function is a logic zero, controller 30 does not increment the active cycle counter value.

After a period of time, DPM 32 reads active cycle counter register 35 and divides the read active cycle counter value by the frequency of clock generator 34 to determine how long GPU 12 was active during the period of time (e.g., the active time of GPU 12). The period of time may be a preset period of time or variable (e.g., DPM 32 reads active cycle counter register 35 every time GPU 12 becomes idle). There may be other ways in which to determine the active time, and the above is one example.

To determine the stall time of GPU 12, DPM 32 may read the busy cycle counter value from busy cycle counter register 37 after a period time. For instance, DPM 32 reads busy cycle counter register 37 and active cycle counter register 35 after the same period time (e.g., read approximately at the time). DPM 32 then subtracts the active time value from the busy time value to determine the stall time.

In some examples, if controller 30 determines that a clock cycle of clock generator 34 passed and circuit blocks of GPU 12 were stalled waiting for data and/or instructions from bus 20, controller 30 may increment busy cycle counter value stored in busy cycle counter register 37. CPU 6 (e.g., DPM 32 of circuitry 25) can calculate GPU 12 stall cycles by subtracting GPU active cycles from busy cycles. CPU 6 (e.g., DPM 32 of circuitry 25) can also read GPU stall cycle counter value directly from a stall counter register if it is available. CPU 6 divides the stall cycles by the frequency of clock generator 34 to determine how long GPU 12 was stalled during the period of time (e.g., the stall time of GPU 12).

Again, it should be understood that stall time and idle time of GPU 12 are different concepts, and should not be confused. For instance, controller 30 may increment busy cycle counter register 37 when GPU 12 first tries to retrieve data or instructions from cache and then if there is a cache miss, attempts to retrieve the data or instructions from system memory 10. During idle time, there are no instructions or data to retrieve. During idle time, controller 30 may not increment busy cycle counter register 37.

As described above, GPU 12 is considered active if one or more blocks within GPU 12 is active for a clock cycle (rising edge to rising edge or falling edge to falling edge). The active time is not a function of the bus bandwidth, but of the operating frequency. For instance, the active time is a function of number of operations in the clock domain of GPU 12 for a specific operating frequency for a given workload (e.g., the processing of one frame), where the active time is inversely proportional to the operating frequency.

The stall time of GPU 12 is the amount of time the blocks of GPU 12 are stalled waiting for bus data, and is a function of the number of memory operations (e.g., access to system memory 10) for a specific bus speed. Accordingly, the stall time is mostly a function of the bus bandwidth.

DPM 32 may read busy cycle counter register 37 to determine the busy time of GPU 12, where the busy time is equal to the active time plus the stall time. From the busy time, DPM 32 may determine a busy percentage (e.g., busy time divided by the period of time). It should be understood that DPM 32 can determine the busy percentage by dividing the active time by the period of time and the stall time by the period of time and sum the values together.

Based on the busy percentage, DPM 32 may determine whether adjusting the operating point of GPU 12 is feasible. For instance, DPM 32 may store a table of different operating points with a preset upscaling threshold associated with each of the operating points. The upscaling thresholds are often the same for all operating points, but can also be different. Circuitry 25, via DPM 32, may calculate what the busy percentage would be at one of the different operating points, compare the busy percentage to its upscaling threshold (e.g., 90%), and adjust the operating point of GPU 12 based on the comparison. For instance, assume that the busy percentage for the current operating point is less than the upscaling threshold of the current operating point. If the busy percentage at the lower operating point is still less than the upscaling threshold of this lower operating point, circuitry 25, via DPM 32, may adjust the operating point to this lower operating point. A lower operating point is one associated with a lower operating frequency than the operating frequency of the current operating point and a bus bandwidth that is the same as the bus bandwidth of the current operating point, a lower bus bandwidth than the current bus bandwidth and an operating frequency that is the same as the operating frequency of the current operating point, or a lower operating frequency than the operating frequency of the current operating point and a lower bus bandwidth than the current bus bandwidth. If the busy percentage for the current operating point is greater than the upscaling threshold of the current operating point, circuitry 25, via DPM 32, may adjust to a higher operating point.

To determine the busy percentage at the other operating point, circuitry 25, via DPM 32, determines the active time and stall time at the other operating point as separate values. For instance, assume that GPU 12 is operating at a current operating point, referred to as a first operating point having a first operating frequency and a first bus bandwidth. In this example, the other operating point, referred to as a second operating point, has a second operating frequency and a second bus bandwidth.

The active time of GPU 12 at the second operating point is based on the active time of GPU 12 at the first operating point and a ratio between the first operating frequency and the second operating frequency. For example, circuitry 25, via DPM 32, may determine that the active time at the second operating point equals active time at first operating point multiplied by (first operating frequency/second operating frequency).

The stall time of GPU 12 at the second operating point is based on the stall time of GPU 12 at the first operating point and a ratio between the first bus bandwidth and the second bus bandwidth. For example, circuitry 25, via DPM 32, may determine that the stall time at the second operating point equals the stall time at first operating point multiplied by (first bus bandwidth/second bus bandwidth). It should be understood that the first bus bandwidth is the effective, current bus bandwidth and not necessarily that associated with a particular operating point. As described above, CPU 6, GPU 12, and possibly other components of device 2 include bus interfaces that determine the amount of data each is transferring on bus 20 and determine what the bus bandwidth should be. These components may output the determined bus bandwidth information to the bus driver running on CPU 6 or another processing unit, and this bus driver may determine what the actual bus bandwidth should be. For instance, CPU 6 may vote for a particular bus bandwidth, but based on the voting from the other components may determine a different bus bandwidth.

As a basic example, assume that for the current operating point (e.g., the first operating point), the processing unit is active time is 5 ms, the stall time is 1 ms, the operating frequency is 200 MHz and the effective bus bandwidth is 2 GB/s. Assume that for a second operating point, the operating frequency is 100 MHz and the bus bandwidth is 1 GB/s, as indicated by the stored table for the different operating points. In this example, circuitry 25, via DPM 32, may determine the active time at the second operating point as 5 ms*(200 MHz/100 MHz)=10 ms and determine the stall time at the second operating point as 1 ms*(2 GB/s/1 GB/s)=2 ms.

In this example, circuitry 25, via DPM 32, may determine the busy time at the second operating point to be 10 ms+2 ms=12 ms, whereas the busy time at the first operating point was 5 ms+1 ms=6 ms. If the period of time at which circuitry 25, via DPM 32, reads active cycle counter register 35 or busy cycle counter register 37 every 16 ms, then the busy percentage at the first operating point is 6 ms/16 ms=37.5% and the busy percentage at the second operating point is 12 ms/16 ms=75%. If the threshold is 80%, then circuitry 25, via DPM 32, may determine that it is safe to adjust the operating point of GPU 12 from the first operating point to the second operating point to save power without impacting performance. If, however, the threshold is 70%, then circuitry 25, via DPM 32, may determine that it is not safe to adjust the operating point of GPU 12 from the first operating point to the second operating point, and may not adjust the operating point of GPU 12 or may attempt to identify another operating point to which the operating point can be adjusted without performance degradation.

The first operating point identifies a first operating frequency for GPU 12 and a first bus bandwidth for bus 20 that interconnects GPU 12 to system memory 10. However, the first bus bandwidth may not be the actual bus bandwidth. In the example techniques, circuitry 25, via DPM 32, may use the effective bus bandwidth for calculation purposes, although it is possible for circuitry 25, via DPM 32, to use the bus bandwidth associated with the first operating point for calculations as well. In this disclosure, first bus bandwidth may refer generically to either the effective bus bandwidth for the current operating point or the bus bandwidth associated with the current operating point.

The second operating point identifies a second operating frequency for GPU 12 and a second bus bandwidth for bus 20 that interconnects GPU 12 to system memory 10. In some examples, the first operating frequency and second operating frequency are different and the first bus bandwidth and the second bus bandwidth are the same. In some examples, the first operating frequency and second operating frequency are the same and the first bus bandwidth and the second bus bandwidth are different. In some examples, the first operating frequency and second operating frequency are different and the first bus bandwidth and the second bus bandwidth are different.

Also, the above examples are described with determining busy percentages from busy times, which are determined from active times and stall times. However, the busy percentages may be calculated directly from active time percentage and stall time percentages. For instance, circuitry 25, via DPM 32, may determine the active time percentage at the first operating point (e.g., active time divided by period of time) and determine the stall time percentage at the first operating point (e.g., stall time divided by period of time). Then, circuitry 25, via DPM 32, may determine the active time percentage at the second operating point by multiplying the active time percentage at the first operating point with the ratio between the operating frequencies and determine the stall time percentage at the second operating point by multiplying the stall time percentage with the ratio between the bus bandwidths. Circuitry 25, via DPM 32, then adds the active time percentage and stall time percentage at the second operating point to determine the busy percentage at the second operating point.

Because the techniques described in this disclosure may be applied based on active time and active time percentage and stall time and stall time percentage, the disclosure uses the term "active time" to generically refer to an amount of active time and active time percentage and uses the term "stall time" to generically refer to an amount of stall time and stall time percentage. Also, although the techniques are described with respect to CPU 6 and GPU 12, in general, the techniques may be applicable to various types of processing units (also referred to as processing circuitry).

For example, circuitry 25, via DPM 32, of CPU 6 determines a first active time (e.g., first amount of active time or first active time percentage) of a processing unit (e.g., GPU 12, a DSP, etc.) at a first operating point, and determines a first stall time (e.g., first amount of stall time or first stall time percentage) of the processing unit at the first operating point. Circuitry 25, via DPM 32, also determines a second active time (e.g., second amount of active time or second active time percentage) of the processing unit based on the first active time at a second operating point, and determines a second stall time (e.g., second amount of stall time or second stall time percentage) of the processing unit based on the first stall time at the second operating point.

Circuitry 25, via DPM 32, determines whether to adjust an operating point of the processing unit from the first operating point to the second operating point based on the second active time and the second stall time. Circuitry 25, via DPM 32, adjusts the operating point of the processing unit from the first operating point to the second operating point based on the determination to adjust the operating point of the processing unit.

Circuitry 25, via DPM 32, may determine a busy percentage based on the second active time and the second stall time, compare the busy percentage to a threshold, and determine whether to adjust the operating point based on the comparison. To determine the second active time of the processing unit, circuitry 25, via DPM 32, determines the second active time based on the first active time and a ratio of the operating frequency of the processing unit for the first operating point and an operating frequency of the processing unit for the second operating point (e.g., first active time multiplied by ratio between operating frequency at first operating point and operating frequency at second operating point). To determine the second stall time based on the first stall time, circuitry 25, via DPM 32, determines the second stall time based on the first stall time and a ratio of a bus bandwidth for the first operating point (e.g., the effective bus bandwidth while GPU 12 is operating at the first operating point or the bus bandwidth associated with the first operating point) and a bus bandwidth for the second operating point (e.g., first stall time multiplied by ratio between bus bandwidth at first operating point and bus bandwidth at second operating point).

Figure 3A:
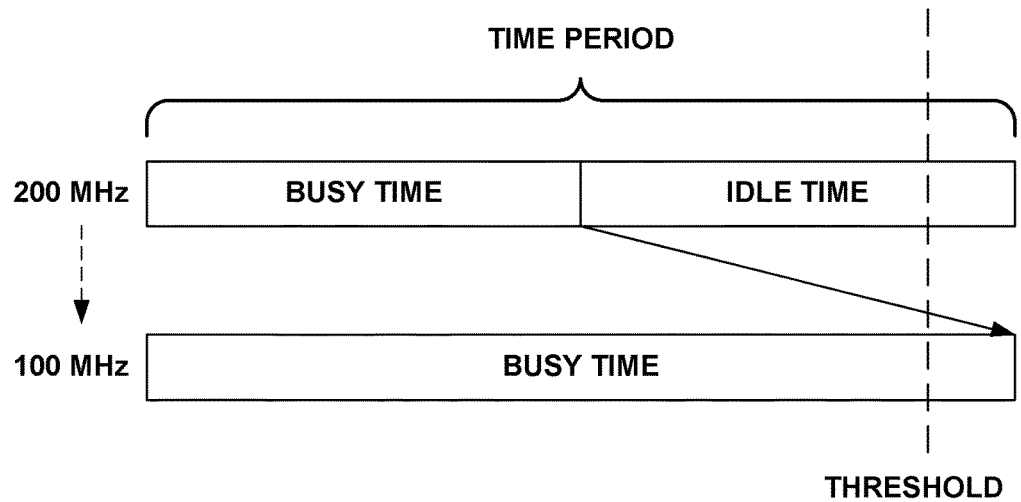
FIGS. 3A and 3B are conceptual diagrams illustrating an example of busy percentages as a function of operating frequency in accordance with examples described in this disclosure.
Figure 3B:
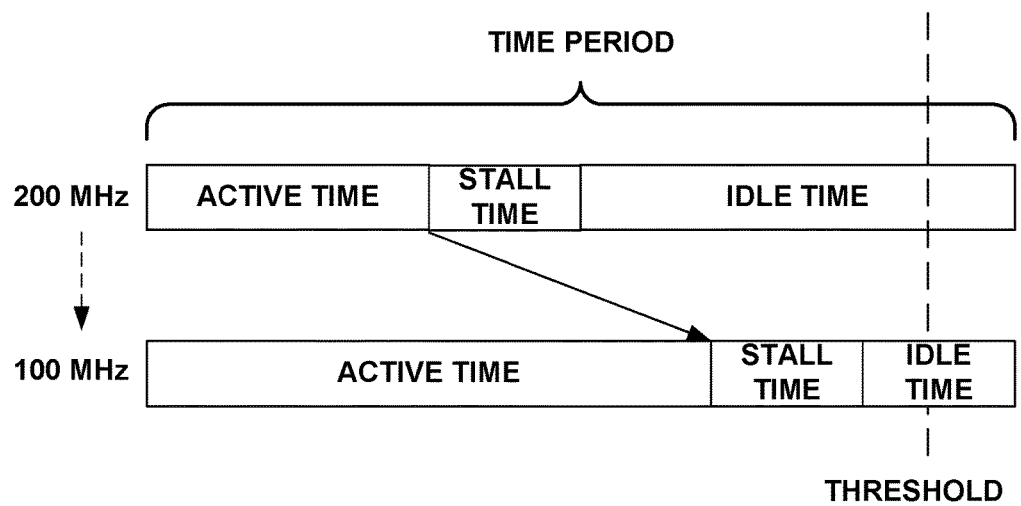

FIGS. 3A and 3B are conceptual diagrams illustrating an example of busy percentages as a function of operating frequency in accordance with examples described in this disclosure. In FIG. 3A, the operating frequency is 200 MHz, and over the time period, GPU 12 is busy half of the time (e.g., 50% busy percentage) and idle for the other 50%. If the assumption is made that the busy time at a different operating frequency can be determined solely based on the busy time at the current operating frequency and the ratios between the frequencies, then, as illustrated in FIG. 3A, CPU 6 may determine that the busy percentage when the operating frequency is halved to 100 MHz would be 100% (e.g., 50%*2). In this case, CPU 6 may determine that the operating frequency of GPU 12 should not be reduced to 100 MHz because 100% is greater than the threshold (e.g., 90% busy percentage).

However, the assumption that the busy time at a different operating frequency is only based on the busy time at the current operating frequency may be faulty because the stall time is not a function of the operating frequency. For example, as illustrated in FIG. 3B, the active time and the stall time are separately illustrated for both the 200 MHz operating frequency and the 100 MHz operating frequency. In this example, if the bus bandwidth does not change, then the stall time does not change if the operating frequency is reduced by 50%. Only the active time doubles. In this case, the addition of the active time and the stall time at the second operating frequency is less than the threshold and CPU 6 may adjust the operating frequency of GPU 12 from 200 MHz to 100 MHz.

For instance, in FIG. 3B, assume that for the 200 MHz operating frequency, the active time percentage is 30% of the time period and the stall time percentage is 20% of the time period for a busy time of 50%, which is consistent with FIG. 3A. In accordance with the techniques described in this disclosure, CPU 6 may determine that the active time percentage at 100 MHz is 60% (e.g., 30%*200 MHz/100 MHz) and the stall time percentage will remain 20% (e.g., bus bandwidth is constant). In this case, the busy percentage is 80% and less than the threshold, rather than the determination that the busy percentage will be 100% and greater than the threshold, as in FIG. 3A.

Figure 4A:
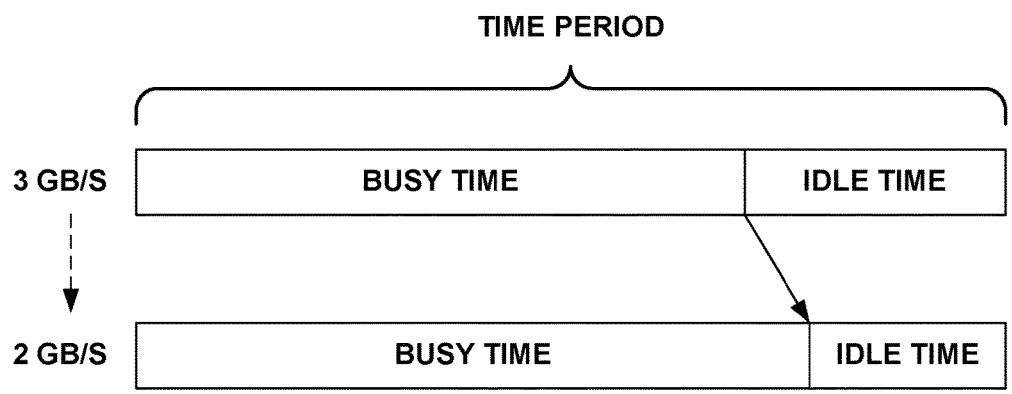
FIGS. 4A and 4B are conceptual diagrams illustrating an example of busy percentages as a function of bus bandwidth in accordance with examples described in this disclosure.
Figure 4B:
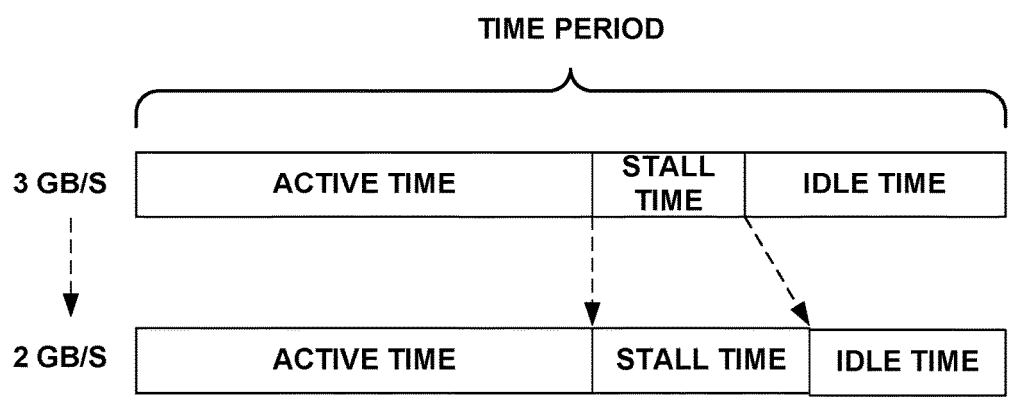

FIGS. 4A and 4B are conceptual diagrams illustrating an example of busy percentages as a function of bus bandwidth in accordance with examples described in this disclosure. FIGS. 4A and 4B are similar to those of FIGS. 3A and 3B, but from the perspective where the bus bandwidth changes and the operating frequency is constant.

For instance, FIG. 4A illustrates the busy time calculation where the bus bandwidth decreases causing an increase in the busy time. In this case, some techniques, such as those described with respect to FIG. 3A, may determine that there is no change in busy time. However, as bus 20 has limited bandwidth, the busy time does increase as illustrated in FIG. 4A. Accordingly, with the techniques, like those described with respect to FIG. 3A, CPU 6 may not be able properly determine whether the busy percentage is less than or greater than the threshold.

However, in the techniques described in this disclosure, CPU 6 (e.g., via DPM 32 of circuitry 25) may separately determine the active time or the percentage of time GPU 12 is active and determine the stall time or the percentage of time GPU 12 is stalled, and then determine the busy percentage based on these constituent values. In this case, CPU 6 may be able to better determine whether the busy percentage is greater than or less than the threshold, to better determine whether to reduce the bus bandwidth or not. For instance, as illustrated in FIG. 4B, CPU 6 may properly determine that only the stall time will increase when there is a reduction in the bus bandwidth and that the active time will remain constant. CPU 6 may use the active time and stall times as separate values for determining whether to adjust the operating point.

Figure 5:
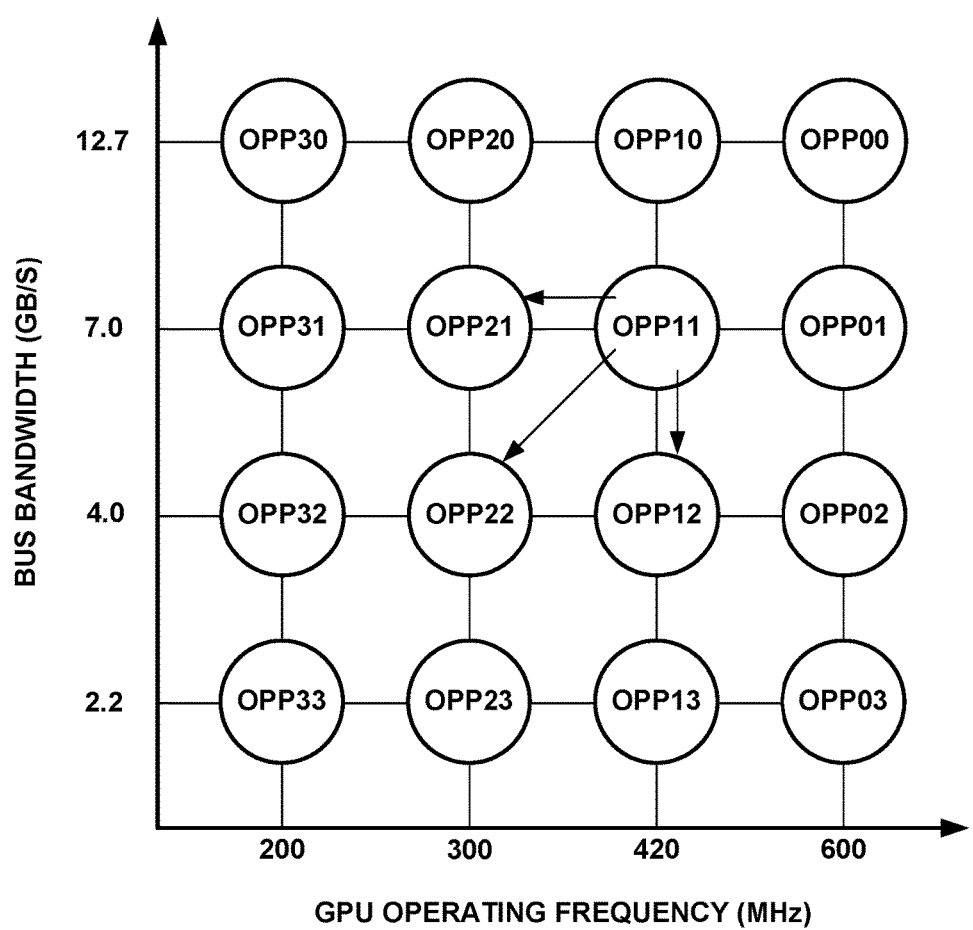
FIG. 5 is a conceptual diagram illustrating examples of operating points for combinations of different operating frequencies and bus bandwidths.

FIG. 5 is a conceptual diagram illustrating examples of operating points for combinations of different operating frequencies and bus bandwidths. For instance, FIG. 5 conceptually illustrates the table that circuitry 25 of CPU 6 (e.g., via DPM 32) may retrieve for the different operating points. For instance, in the example illustrated in FIG. 5, OPP00 identifies operating frequency of 600 MHz and bus bandwidth of 12.7 GB/s, OPP10 identifies operating frequency of 420 MHz and bus bandwidth of 12.7 GB/s, and so forth, where OPP33 identifies operating frequency of 200 MHz and bus bandwidth of 2.2 GB/s. FIG. 5 is merely one example of different operating frequencies and bus bandwidths, and more, fewer, or different combinations of operating frequencies and bus bandwidths are possible.

In the example illustrated in FIG. 5, assume that GPU 12 is operating at OPP11 (e.g., 420 MHz and 7.0 GB/s). However, it is possible that the effective bus bandwidth is different than 7.0 GB/s. For ease of description, the following assumes that the effective bus bandwidth is 7.0 GB/s, but in examples where the effective bus bandwidth is different, the effective bus bandwidth is used in the calculations.

Also, assume that CPU 6 determined that at OPP11, the busy percentage is substantially less than the threshold. For instance, an upscaling threshold may indicate the upper limit of the busy percentage above which there may be performance degradation. If CPU 6 determines that the busy percentage at OPP11 is less than the upscaling threshold of OPP11, and determines the busy percentage at lower operating points of GPU 12 are greater than the corresponding upscaling thresholds of these lower operating points, CPU 6 may not determine whether to adjust to these lower operating points of GPU 12. If, however, CPU 6 determines that the busy percentage at one of the lower operating points of GPU 12 is less than the upscaling threshold of this lower operating point of GPU 12, CPU 6 may perform the example techniques described in this disclosure.

If CPU 6 determines that the operating point should be adjusted, CPU 6 may determine what the busy percentage would be, using the techniques described in this disclosure, at a neighboring operating point. For example, CPU 6 may determine the busy percentages at OPP21, OPP22, and OPP12, as illustrated by the arrows extending from OPP11, and determine the lowest operating point with a busy percentage under the upscaling threshold of this operating point. CPU 6 may then cause GPU 12 to operate at the determined operating point.

As another example, CPU 6 may sequentially determine the busy percentages for each of the operating points, and stop determining when CPU 6 found an operating point where the busy percentage is less than the threshold. The sequence of the operating points for determining what the busy percentages would be may be a matter of design choice and the various permutations are contemplated by this disclosure.

In the example illustrated in FIG. 5, CPU 6 may determine busy percentages at up to three operating points. In other examples, CPU 6 may determine busy percentages at more or fewer than three operating points. Also, the operating points need not be necessarily neighbor the current operating point.

Figure 6:
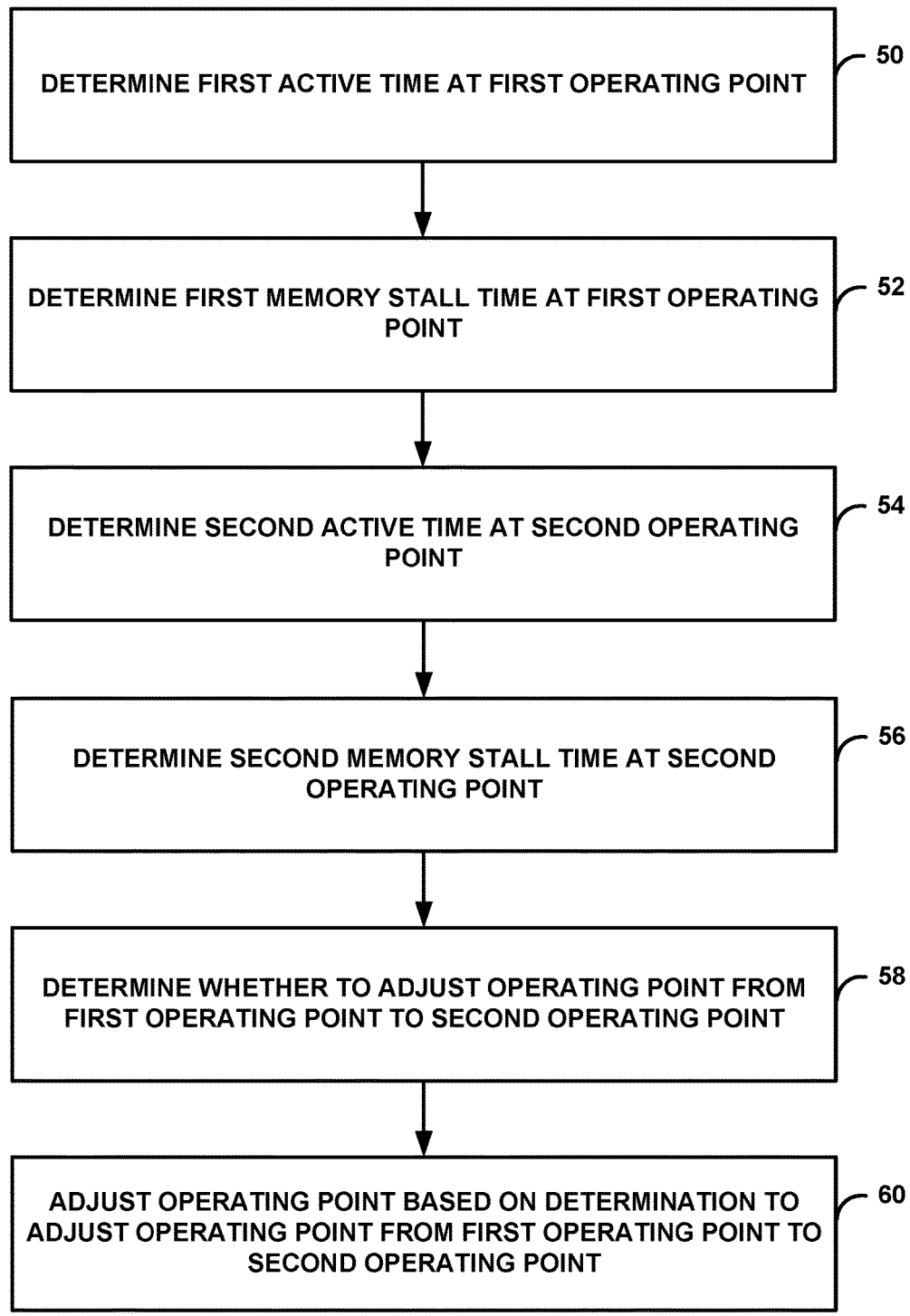
FIG. 6 is a flowchart illustrating an example method of operating frequency and bus bandwidth determination according to techniques described in this disclosure.

FIG. 6 is a flowchart illustrating an example method of operating frequency and bus bandwidth determination according to techniques described in this disclosure. The example of FIG. 6 is described with respect to circuitry 25 being configured to perform the example techniques. Circuitry 25 may be configured to execute instructions of DPM 32 that configures circuitry 25 to perform the example illustrated in FIG. 6. As another example, DPM 32 may be fixed-function circuit block of circuitry 25.

Furthermore, although circuitry 25 is illustrated as being part of CPU 6, in some examples, circuitry 25 may be part of the processing unit whose operating point is being determined. For instance, device 2 may include a processing unit (e.g., GPU 12 or a DSP) and circuitry 25 that is configured to determine the operating point of the processing unit using example techniques described in this disclosure. In some examples, CPU 6 includes circuitry 25. In some examples, the processing unit includes circuitry 25. In some examples, CPU 6 includes circuitry 25 and circuitry 25 is configured to determine the operating point of CPU 6 using the example techniques.

In the example of FIG. 6, circuitry 25, via DPM 32, determines a first active time of a processing unit at a first operating point (50). The first active time indicates an amount of time or percentage of time the processing unit is active, in a clock domain of the processing unit in processing data, within a period of time.

As one example, DPM 32 (e.g., executing on circuitry 25 of CPU 6 or formed as circuit blocks on circuitry 25 of CPU 6) reads the value of active cycle counter register 35 after a period of time, and divides the value by the operating frequency to determine the active time. DPM 32 may then divide the active time by the period of time to determine the active time percentage.

Circuitry 25 determines a first stall time of the processing unit at the first operating point (52). The first stall time may indicate an amount of time or percentage of time the processing unit is stalled while waiting for operations in another clock domain during the period of time.

As one example, DPM 32 reads the value of busy cycle counter register 37 after a period of time, subtracts the active time value from the busy time value, and divides the resulting value by the operating frequency to determine the stall time. DPM 32 may then divide the stall time by the period of time to determine the stall time percentage.

Circuitry 25 determines a second active time of the processing unit based on the first active time at a second operating point (54). For example, circuitry 25 determines the second active time based on the first active time and a ratio of an operating frequency of the processing unit for the first operating point and an operating frequency of the processing unit for the second operating point.

Circuitry 25 determines a second stall time of the processing unit based on the first stall time at the second operating point (56). For example, circuitry 25 determines the second stall time based on the first stall time and a ratio of effective bus bandwidth when the processing unit is operating at the first operating point and a bus bandwidth for the second operating point.

In this example, the first operating point identifies a first operating frequency for the processing unit and a first bus bandwidth for bus 20 that interconnects the processing unit to system memory 10. The second operating point identifies a second operating frequency for the processing unit and a second bus bandwidth for bus 20 that interconnects the processing unit to system memory 10. The first operating frequency and second operating frequency may be different (e.g., second operating frequency less than first operating frequency) and the first bus bandwidth and the second bus bandwidth may be the same, the first operating frequency and second operating frequency may be the same and the first bus bandwidth and the second bus bandwidth may be different (e.g., second bus bandwidth less than first bus bandwidth), or the first operating frequency and second operating frequency may be different and the first bus bandwidth and the second bus bandwidth are different (e.g., second operating frequency less than first operating frequency and second bus bandwidth less than first bus bandwidth).

Circuitry 25 may determine whether to adjust an operating point of the processing unit from the first operating point to the second operating point based on the second active time and the second stall time (58). For instance, circuitry 25 may determine a busy percentage based on the second active time and the second stall time, compare the busy percentage to a threshold, and determine whether to adjust the operating point of the processing unit based on the comparison.

Circuitry 25 may adjust the operating point of the processing unit from the first operating point to the second operating point based on the determination to adjust the operating point of the processing unit (60). In this way, circuitry 25, via DPM 32, may adjust the operating point to minimize power without affecting performance.

Figure 7A:
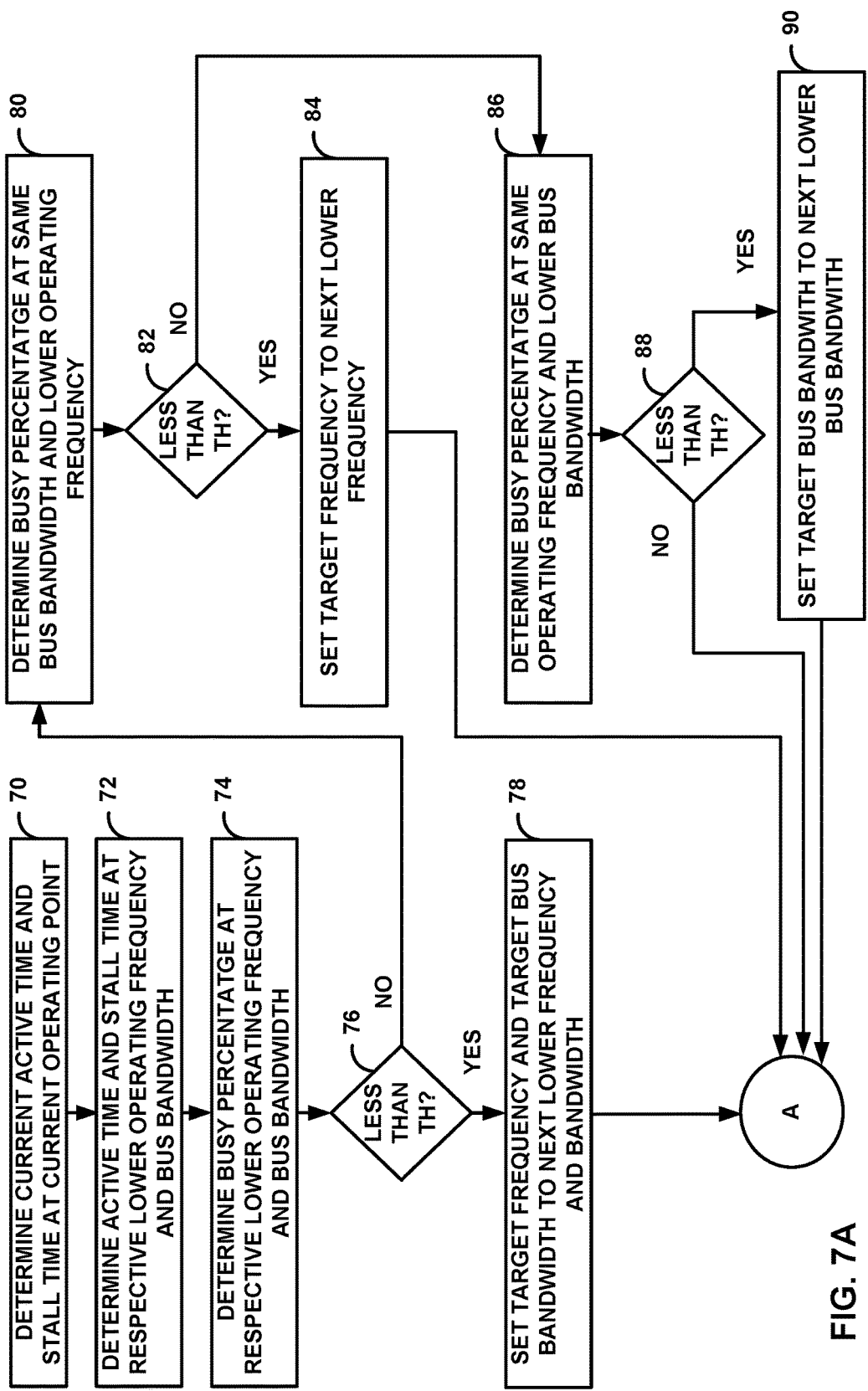
FIGS. 7A and 7B are flowcharts illustrating an example algorithm of determining operating point.
Figure 7B:
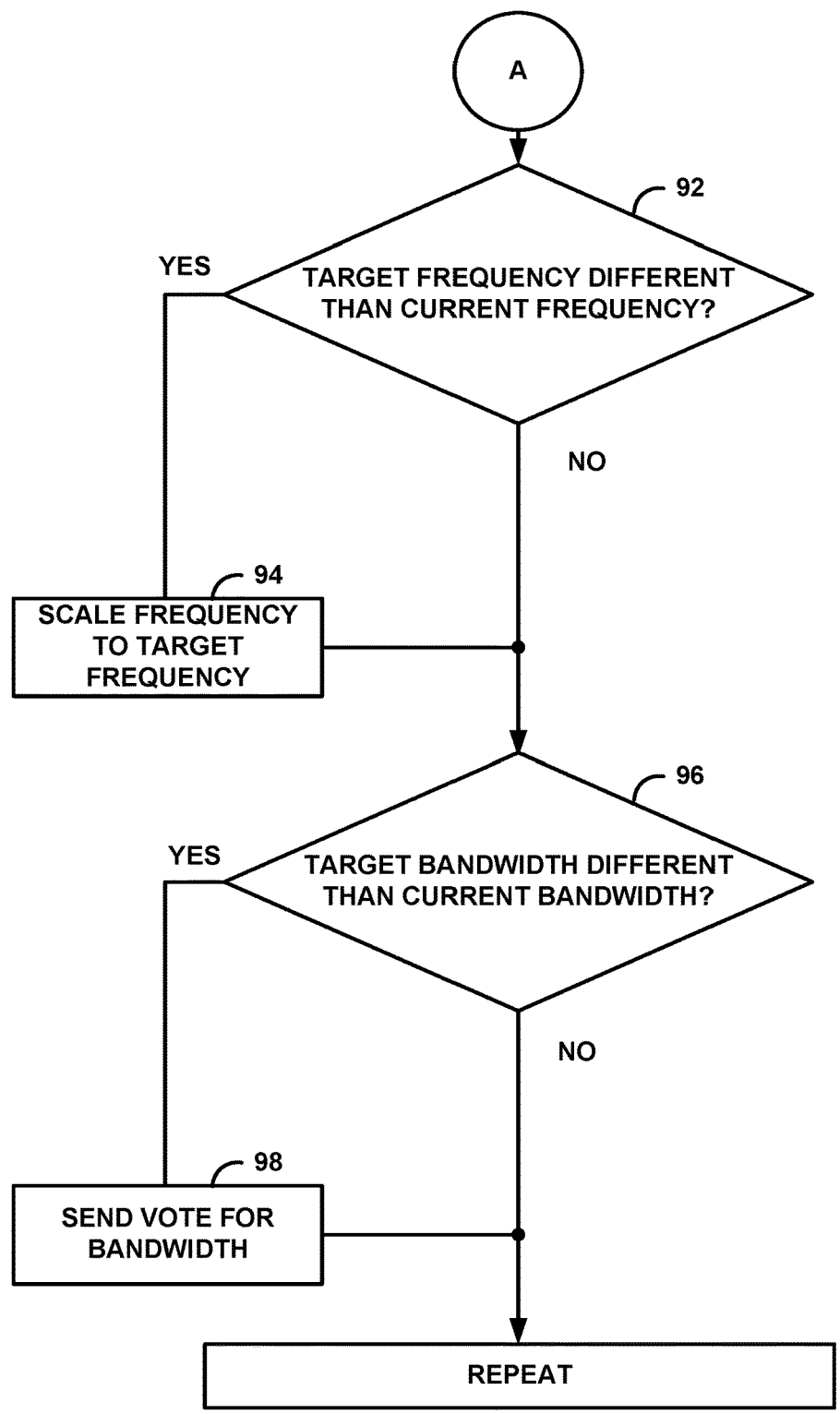

FIGS. 7A and 7B are flowcharts illustrating an example algorithm of determining operating point. FIGS. 7A and 7B are described with respect to DPM 32 of circuitry 25. DPM 32 may determine the current active time and stall time at current operating point (70). For example, DPM 32 may read the active time value from active cycle counter register 35 to determine the current active time. DPM 32 read the busy cycle counter value from busy cycle counter register 37, and subtract the active time value to determine the current stall time. For ease of illustration, assume that the current operating point is OPP11 of FIG. 5.

DPM 32 may determine active time and stall time at respective lower operating frequency and lower bus bandwidth (72). For example, DPM 32 may determine the active time and stall time at OPP22, where active time at OPP22 equals current active time*(current operating frequency/operating frequency of OPP22) and stall time at OPP22 equals current stall time*(current effective bus bandwidth/bus bandwidth of OPP22). DPM 32 may then determine the busy percentage at OPP22 (74).

If the busy percentage at OPP22 is less than threshold (e.g., 90%) (YES of 76), DPM 32 may set the target operating frequency and target bus bandwidth to operating frequency and bus bandwidth of OPP22 (78). The algorithm may then proceed to block A described in FIG. 7B.

If the busy percentage at OPP22 is not less than threshold (e.g., 90%) (NO of 76), DPM 32 may determine busy percentage at same bus bandwidth and lower operating frequency (e.g., OPP21) (80). For example, similar to above, DPM 32 may determine the active time at OPP21 as current active time*(current operating frequency/operating frequency of OPP21) and stall time at OPP21 equals current stall time*(current bus bandwidth/bus bandwidth of OPP21). Based on the active time and stall time at OPP21, DPM 32 may determine the busy percentage at OPP21.

If the busy percentage at OPP21 is less than threshold (e.g., 90%) (YES of 82), DPM 32 may set the target operating frequency to operating frequency of OPP21 (84). The algorithm may then proceed to block A described in FIG. 7B.

If the busy percentage at OPP21 is not less than threshold (e.g., 90%) (NO of 82), DPM 32 may determine busy percentage at same operating frequency and lower bus bandwidth (e.g., OPP12) (86). For example, similar to above, DPM 32 may determine the active time at OPP12 as current active time*(current operating frequency/operating frequency of OPP12) and stall time at OPP12 equals current stall time*(current bus bandwidth/bus bandwidth of OPP12). Based on the active time and stall time at OPP12, DPM 32 may determine the busy percentage at OPP12.

If the busy percentage at OPP12 is less than threshold (e.g., 90%) (YES of 88), DPM 32 may set the target bus bandwidth to bus bandwidth of OPP12 (90), and the algorithm may then proceed to block A described in FIG. 7B. If the busy percentage at OPP12 is not less than threshold (e.g., 90%) (NO of 88), the algorithm may then proceed to block A described in FIG. 7B.

As illustrated in FIG. 7B, DPM 32 may determine whether the target operating frequency (as may have been determined in block 78 or 84) is different than the current frequency (92). If target operating frequency is different than the current frequency (YES of 92), DPM 32 may scale operating frequency to target frequency.

If target operating frequency is not different than the current frequency (NO of 92) or after scaling operating frequency, DPM 32 may determine whether the target bus bandwidth (as may have been determined in block 78 or 90) is different than current bus bandwidth (96). If target bus bandwidth is different than the current bus bandwidth (YES of 96), DPM 32 may send vote for target bus bandwidth (98). If target bus bandwidth is not different than the current bus bandwidth (NO of 96) or after scaling operating frequency, DPM 32 may repeat the algorithm after certain delay or for the next frame and again determine current active time and stall time, and repeat the algorithm illustrated in blocks 70-98.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of operating point determination, the method comprising:
   determining a first active time of a processing unit at a first operating point;
   determining a first stall time of the processing unit at the first operating point;
   determining a second active time of the processing unit based on the first active time at a second operating point;
   determining a second stall time of the processing unit based on the first stall time at the second operating point;
   determining whether to adjust an operating point of the processing unit from the first operating point to the second operating point based on the second active time and the second stall time; and
   adjusting the operating point of the processing unit from the first operating point to the second operating point based on the determination to adjust the operating point of the processing unit.

2. The method of claim 1, wherein the first operating point identifies a first operating frequency, wherein a bus bandwidth of a bus that interconnects the processing unit to a system memory when the processing unit is operating at the first operating point is a first bus bandwidth, wherein the second operating point identifies a second operating frequency and identifies a second bus bandwidth for the bus that interconnects the processing unit to the system memory, and wherein one of:
   the second operating frequency is less than the first operating frequency and the first bus bandwidth and the second bus bandwidth are the same,
   the first operating frequency and second operating frequency are the same and the second bus bandwidth is less than the first bus bandwidth, or
   the second operating frequency is less than the first operating frequency and the second bus bandwidth is less than the first bus bandwidth.

3. The method of claim 1, further comprising:
   determining a busy percentage based on the second active time and the second stall time; and
   comparing the busy percentage to a threshold,
   wherein determining whether to adjust the operating point comprises determining whether to adjust the operating point of the processing unit based on the comparison of the busy percentage to the threshold.

4. The method of claim 1, wherein determining the second active time of the processing unit comprises:
   determining the second active time based on the first active time and a ratio of an operating frequency of the processing unit for the first operating point and an operating frequency of the processing unit for the second operating point.

5. The method of claim 1, wherein determining the second stall time of the processing unit comprises:
   determining the second stall time based on the first stall time and a ratio of effective bus bandwidth when the processing unit is operating in the first operating point and a bus bandwidth for the second operating point.

6. The method of claim 1, wherein the first active time indicates an amount of time or percentage of time the processing unit is active processing data within a period of time in a clock domain of the processing unit, and wherein the first stall time indicates an amount of time or percentage of time the processing unit is stalled while waiting for operations in another clock domain during the period of time.

7. The method of claim 1, wherein the processing unit comprises a second processing unit, and wherein:
   determining the first active time comprises determining, with a first processing unit, the first active time,
   determining the first stall time comprises determining, with the first processing unit, the first stall time,
   determining the second active time comprises determining, with the first processing unit, the second active time,
   determining the second stall time comprises determining, with the first processing unit, the second stall time,
   determining whether to adjust the operating point comprises determining, with the first processing unit, whether to adjust the operating point, and
   adjusting the operating point comprises adjusting, with the first processing unit, the operating point.

8. The method of claim 7, wherein the first processing unit comprises a central processing unit (CPU), and the second processing unit comprises one of a graphics processing unit (GPU) or a digital signal processor (DSP).

9. The method of claim 7, wherein the first processing unit and the second processing unit are the same processing unit.

10. A device for operating point determination, the device comprising:
    a processing unit; and
    circuitry configured to:
       determine a first active time of the processing unit at a first operating point;
       determine a first stall time of the processing unit at the first operating point;
       determine a second active time of the processing unit based on the first active time at a second operating point;
       determine a second stall time of the processing unit based on the first stall time at the second operating point;
       determine whether to adjust an operating point of the processing unit from the first operating point to the second operating point based on the second active time and the second stall time; and
       adjust the operating point of the processing unit from the first operating point to the second operating point based on the determination to adjust the operating point of the processing unit.

11. The device of claim 10, wherein the circuitry is configured to execute instructions of a dynamic power manager (DPM) that configures the circuitry to determine the first active time, determine the first stall time, determine the second active time, determine the second stall time, determine whether to adjust the operating point, and adjust the operating point.

12. The device of claim 10, further comprising:
    a central processing unit (CPU), wherein the CPU comprises the circuitry, and wherein the processing unit comprises one of a graphics processing unit (GPU) or a digital signal processor (DSP).

13. The device of claim 10, wherein the processing unit includes the circuitry.

14. The device of claim 10, further comprising:
a system memory;
a bus that interconnects the processing unit to the system memory,
wherein the first operating point identifies a first operating frequency, wherein a bus bandwidth of the bus when the processing unit is operating at the first operating point is a first bus bandwidth, wherein the second operating point identifies a second operating frequency and identifies a second bus bandwidth for the bus, and wherein one of:
the second operating frequency is less than the first operating frequency and the first bus bandwidth and the second bus bandwidth are the same,
the first operating frequency and second operating frequency are the same and the second bus bandwidth is less than the first bus bandwidth, or
the second operating frequency is less than the first operating frequency and the second bus bandwidth is less than the first bus bandwidth.

15. The device of claim 10, wherein the circuitry is configured:
determine a busy percentage based on the second active time and the second stall time; and
compare the busy percentage to a threshold,
wherein to determine whether to adjust the operating point, the circuitry is configured to determine whether to adjust the operating point of the processing unit based on the comparison of the busy percentage to the threshold.

16. The device of claim 10, wherein to determine the second active time of the processing unit, the circuitry is configured to:
determine the second active time based on the first active time and a ratio of an operating frequency of the processing unit for the first operating point and an operating frequency of the processing unit for the second operating point.

17. The device of claim 10, wherein to determine the second stall time of the processing unit, the circuitry is configured to:
determine the second stall time based on the first stall time and a ratio of effective bus bandwidth when the processing unit is operating in the first operating point and a bus bandwidth for the second operating point.

18. The device of claim 10, wherein the first active time indicates an amount of time or percentage of time the processing unit is active processing data within a period of time in a clock domain of the processing unit, and wherein the first stall time indicates an amount of time or percentage of time the processing unit is stalled while waiting for operations in another clock domain during the period of time.

19. A device for operating point determination, the device comprising:
means for determining a first active time of a processing unit at a first operating point;
means for determining a first stall time of the processing unit at the first operating point;
means for determining a second active time of the processing unit based on the first active time at a second operating point;
means for determining a second stall time of the processing unit based on the first stall time at the second operating point;
means for determining whether to adjust an operating point of the processing unit from the first operating point to the second operating point based on the second active time and the second stall time; and
means for adjusting the operating point of the processing unit from the first operating point to the second operating point based on the determination to adjust the operating point of the processing unit.

20. The device of claim 19, wherein the first operating point identifies a first operating frequency, wherein a bus bandwidth of a bus that interconnects the processing unit to a system memory when the processing unit is operating at the first operating point is a first bus bandwidth, wherein the second operating point identifies a second operating frequency and identifies a second bus bandwidth for the bus that interconnects the processing unit to the system memory, and wherein one of:
the second operating frequency is less than the first operating frequency and the first bus bandwidth and the second bus bandwidth are the same,
the first operating frequency and second operating frequency are the same and the second bus bandwidth is less than the first bus bandwidth, or
the second operating frequency is less than the first operating frequency and the second bus bandwidth is less than the first bus bandwidth.

21. The device of claim 19, further comprising:
means for determining a busy percentage based on the second active time and the second stall time; and
means for comparing the busy percentage to a threshold,
wherein the means for determining whether to adjust the operating point comprises means for determining whether to adjust the operating point of the processing unit based on the comparison of the busy percentage to the threshold.

22. The device of claim 19, wherein the means for determining the second active time of the processing unit comprises:
means for determining the second active time based on the first active time and a ratio of an operating frequency of the processing unit for the first operating point and an operating frequency of the processing unit for the second operating point.

23. The device of claim 19, wherein the means for determining the second stall time of the processing unit comprises:
means for determining the second stall time based on the first stall time and a ratio of effective bus bandwidth when the processing unit is operating in the first operating point and a bus bandwidth for the second operating point.

24. The device of claim 19, wherein the first active time indicates an amount of time or percentage of time the processing unit is active processing data within a period of time in a clock domain of the processing unit, and wherein the first stall time indicates an amount of time or percentage of time the processing unit is stalled while waiting for operations in another clock domain during the period of time.

25. A non-transitory computer-readable storage medium storing instructions that when executed cause one or more processors to:
determine a first active time of a processing unit at a first operating point;

determine a first stall time of the processing unit at the first operating point;

determine a second active time of the processing unit based on the first active time at a second operating point;

determine a second stall time of the processing unit based on the first stall time at the second operating point;

determine whether to adjust an operating point of the processing unit from the first operating point to the second operating point based on the second active time and the second stall time; and adjust the operating point of the processing unit from the first operating point to the second operating point based on the determination to adjust the operating point of the processing unit.

26. The non-transitory computer-readable storage medium of claim 25, wherein to determine the second active time of the processing unit, the instructions cause the one or more processors to:

determine the second active time based on the first active time and a ratio of an operating frequency of the processing unit for the first operating point and an operating frequency of the processing unit for the second operating point.

27. The non-transitory computer-readable storage medium of claim 25, wherein to determine the second stall time of the processing unit, the instructions cause the one or more processors to:

determine the second stall time based on the first stall time and a ratio of effective bus bandwidth when the processing unit is operating in the first operating point and a bus bandwidth for the second operating point.

* * * * *